United States Patent
Crosby et al.

(10) Patent No.: US 10,606,498 B2
(45) Date of Patent: Mar. 31, 2020

(54) METHOD FOR ALLOCATING MEMORY

(71) Applicant: Arm IP Limited, Cambridge (GB)

(72) Inventors: James Crosby, Ely (GB); Brendan James Moran, Histon (GB)

(73) Assignee: Arm IP Limited, Cambridge (GB)

( * ) Notice: Subject to any disclaimer, the term of this patent is extended or adjusted under 35 U.S.C. 154(b) by 0 days.

(21) Appl. No.: 16/070,688

(22) PCT Filed: Dec. 23, 2016

(86) PCT No.: PCT/GB2016/054053
§ 371 (c)(1),
(2) Date: Jul. 17, 2018

(87) PCT Pub. No.: WO2017/125711
PCT Pub. Date: Jul. 27, 2017

(65) Prior Publication Data
US 2019/0026024 A1 Jan. 24, 2019

(30) Foreign Application Priority Data

Jan. 19, 2016 (GB) .................................. 1601003.5
Jan. 19, 2016 (GB) .................................. 1617459.1

(51) Int. Cl.
G06F 3/06 (2006.01)
G06F 12/02 (2006.01)
G06F 13/24 (2006.01)

(52) U.S. Cl.
CPC ............ G06F 3/064 (2013.01); G06F 3/0604 (2013.01); G06F 3/0673 (2013.01);
(Continued)

(58) Field of Classification Search
CPC ...... G06F 3/064; G06F 3/0604; G06F 3/0673; G06F 12/0223; G06F 12/023
See application file for complete search history.

(56) References Cited

U.S. PATENT DOCUMENTS 5,983,018 A * 11/1999 Kanzaki ............... G06F 11/362
712/227
6,088,777 A * 7/2000 Sorber ................. G06F 12/023
370/381
(Continued)

FOREIGN PATENT DOCUMENTS

EP 0 840 210 5/1998
WO WO 02/42911 5/2002

OTHER PUBLICATIONS

Hassitt, A. Lyon, LE, Automatically Extensible Discontiguous Stacks, IBM, Feb. 1996. (Year: 1996).*
(Continued)

*Primary Examiner* — Khoa D Doan
(74) *Attorney, Agent, or Firm* — Leveque IP Law, P.C.

(57) ABSTRACT

A method for managing a discontinuous call stack is disclosed to more efficiently use the memory of devices without a memory management unit. The method comprising: storing a stack location indicator indicating a top of said discontinuous call stack in a data store; using said stack location indicator to identify a current memory block of said discontinuous call stack from said plurality of memory blocks, said current memory block storing said top of said discontinuous call stack and a previous location indicator indicating a location of a previous memory block of said discontinuous call stack; determining an amount of memory available in said current memory block; determining an amount of memory required for a stack frame; determining an amount of memory required for an interrupt allowance; allocating said stack frame and said interrupt allowance at least one memory block from said plurality of memory blocks in response to said determinations; storing said stack frame in said allocated memory block; and updating said stack location indicator in said data store.

20 Claims, 17 Drawing Sheets

(52) U.S. Cl.
CPC ........ *G06F 12/023* (2013.01); *G06F 12/0223* (2013.01); *G06F 13/24* (2013.01); *G06F 2213/2416* (2013.01)

(56) References Cited

U.S. PATENT DOCUMENTS

| | | | |
|---|---|---|---|
| 6,360,233 B1* | 3/2002 | Houldsworth | G06F 9/5016 |
| 6,865,636 B1* | 3/2005 | Hober | G06F 9/4881 |
| | | | 710/260 |
| 2004/0019744 A1* | 1/2004 | Boucher | G06F 12/0223 |
| | | | 711/132 |

OTHER PUBLICATIONS

Hammersley SD, Lynne KJ, Sharing a Single Stack Among Multiple Concurrent Threads, IBM 1993 (Year: 1993).*

GB1601003.5, Combined Search and Examination Report, GB Intellectual Property Office, dated Jun. 29, 2016.

PCT/GB2016/054053, International Search Report and Written Opinion, EPO, dated Apr. 3, 2017.

Middha et al., "MTSS: Multitask stack sharing for embedded system," ACM Transactions on Embedded Computing Systems (TECS), 7(4), p. 46, 2008.

"Automatically Extensible Discontiguous Stacks," IBM Technical Disclosure Bulletin, vol. 29, No. 2, pp. 307-313, Feb. 1996.

GB1601003.5, Combined Search and Examination Report, GB Intellectual Property Office, dated Sep. 21, 2016.

GB1617459.1, Combined Search and Examination Report, GB Intellectual Property Office, dated Oct. 28, 2016.

Shankar et al., "VLSI and Computer Architecture," VLSI and Computer Architecture, Aug. 28, 1989, p. 434.

"Allocation of Stash Space for Interrupt Routines," IBM Technical Disclosure Bulletin, vol. 30, No. 2, Jul. 2, 1987.

GB1601003.5, Combined Search and Examination Report, GB Intellectual Property Office, dated Oct. 28, 2016.

* cited by examiner

METHOD FOR ALLOCATING MEMORY

RELATED PATENT APPLICATIONS

This patent application is a 35 U.S.C. 371 National stage U.S. patent application of PCT patent application PCT/GB2016/054053 with an International filing date of Dec. 23, 2016 claiming priority to GB patent application 1601003.5 and GB patent application 1617459.1, both filed on Jan. 19, 2016, the entire contents of which are hereby incorporated by reference.

FIELD OF THE DISCLOSURE

The present techniques relate to the efficient use of memory on devices without a memory management unit. More particularly, the techniques relate to a method for allocating memory to a discontinuous call stack.

BACKGROUND

A memory management unit (MMU) handles memory and caching operations associated with a processor in order to manage memory efficiently. However, microcontrollers rarely have a memory management unit (MMU) since MMU's add significant size and power consumption to the design.

DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1A:
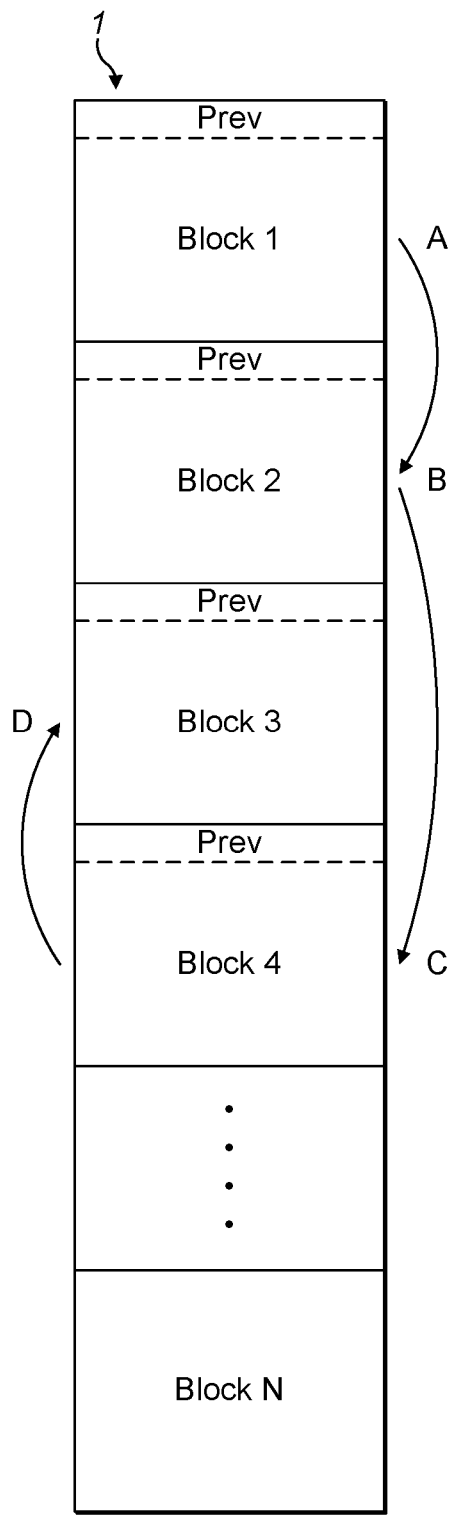
FIGS. 1A and 1B illustrate a memory region divided into a plurality of memory blocks.

Microcontrollers tend to have one, or a limited number of, continuous memory regions divided into separate memory sections. Each memory section is allocated for a different use, with a contiguous section of the memory region reserved for the stack, herein referred to as the stack memory. The stack memory which is used by each task to record its call-stack, grows from one memory address continually towards a higher or lower memory address, as function calls and interrupts/exceptions cause data to be pushed onto the stack. Generally, the stack memory is a continuous section of the memory region as this allows the compiler to do whatever it wants with the stack. In addition, a continuous stack memory is assumed to have zero memory fragmentation.

Conventionally, the stack memory is required to be equal to the amount of memory space required by the largest possible stack size and cannot be used for anything else. Consequently, the stack memory often comprises a lot of memory space which is not being used because most of the time the stack is not as large as the largest possible stack size, but which cannot be used for anything else. In addition, as a result of developers erring on the side of caution, the stack memory is often reserved memory space slightly larger than the largest possible stack memory required.

Originally developers were required to hand-tune stack size on mainframes. When it became unreasonable to ask developers to hand-tune the stack size, MMUs were available for solving the problem of optimising memory allocation. However, it is still considered reasonable to ask embedded developers, or developers for any resource constrained system, to hand optimize things like stack size, or the exact instructions of an inner loop.

The development of operating system technology has largely been on systems with MMUs and there has been very little unique development that happens for non-MMU systems. In addition, the industry tends to rely on a very small number of compiler vendors: most embedded compilers are patched versions of compilers built for MMU-based CPUs. Therefore, without modifying the compiler quite heavily, this technology is onerous to implement for non-MMU systems.

According to a first technique, there is provided a method for managing a discontinuous call stack comprising at least one memory block from a plurality of memory blocks. The method comprising: storing a stack location indicator indicating a top of said discontinuous call stack in a data store; using said stack location indicator to identify a current memory block of said discontinuous call stack from said plurality of memory blocks, said current memory block storing said top of said discontinuous call stack and a previous location indicator indicating a location of a previous memory block of said discontinuous call stack; determining an amount of memory available in said current memory block; determining an amount of memory required for a stack frame; determining an amount of memory required for an interrupt allowance; allocating said stack frame and said interrupt allowance at least one memory block from said plurality of memory blocks in response to said determinations; storing said stack frame in said allocated memory block; and updating said stack location indicator in said data store, such that said updated stack location indicator can be used to identify said allocated memory block which has become said current memory block.

According to a second technique, there is provided a method for managing a discontinuous call stack comprising at least one memory block from a plurality of memory blocks. The method comprising: reserving at least one of said plurality of memory blocks for interrupts; storing an interrupt location indicator indicating said reserved memory block in an interrupt stack pointer data store; storing a stack location indicator indicating a top of said discontinuous call stack in a function stack pointer data store; using said stack location indicator to identify a current memory block of said discontinuous call stack from said plurality of memory blocks, said current memory block storing said top of said discontinuous call stack and a previous location indicator indicating a location of a previous memory block of said discontinuous call stack; determining an amount of memory available in said current memory block; determining an amount of memory required for a stack frame; allocating said stack frame at least one memory block from said plurality of memory blocks in response to said determinations; storing said stack frame in said allocated memory block; and updating said stack location indicator in said function stack pointer data store, such that said updated stack location indicator can be used to identify said allocated memory block which has become said current memory block.

According to a third technique, there is provided a computer program product comprising program code for performing the methods of the first and/or second techniques.

In order to more efficiently utilise the memory region of a microcontroller without an MMU, the memory region can be divided into a plurality of blocks which can be allocated amongst multiple uses, so that any free block of memory can be used for any purpose. However, a separate section of memory is still required to be reserved for the stack, the stack memory region. In one embodiment, in order to more efficiently utilise the stack memory region, the stack memory region is also divided into a plurality of blocks. At runtime, the address of each block and the address of the last byte used within each block or the address of the first free word within each block is required. In one embodiment, each block is the same size. When the plurality of blocks are aligned to, and the size of the same power of 2, for example 128 bytes or 256 bytes, the address of each block can be determined from any address within the block, so that only the address of the last byte used within each block or the address of the first free word within each block is required.

In another embodiment, the stack memory region can be divided into a plurality of different sized blocks. A conventional heap allocator or a multi-pool allocator can be utilised when the stack memory region is divided into a plurality of different sized blocks. However, when the stack memory region is divided into a plurality of different sized blocks, it is not possible to determine the address of each block from any address within the block. Therefore, the address of each block, and the address of the last byte used within each block or the address of the first free word within each block is required.

Each memory block within the stack memory region can be allocated for use when it becomes available. The blocks are not required to be allocated in sequential order. This results in a discontinuous stack. A discontinuous stack is unlikely to have zero memory fragmentation, since it is not guaranteed that the whole content of one memory block of the stack can be used. This memory fragmentation is dealt with through pool allocation, however, the stack memory region is unlikely to be used at 100% efficiency.

A memory block is considered to be an "available" memory block for allocation, when no data is stored in the memory block or when a stack frame stored in the memory block has completed executing and is no longer required to be stored. The stack memory region becomes a linked list of memory blocks linked once allocated and unlinked when no longer required. Data is stored in the memory blocks of the discontinuous stack for as long as required and can be popped off the stack as known in the art.

A stack-space allocator is used to allocate the memory blocks on an as-needed basis. The stack-space allocator allocates space to the next stack frame either in the current memory block or in a new memory block depending on the amount of space required by the next stack frame and the amount of space available in the current memory block, as explained in further detail below.

FIG. 1A illustrates a stack memory 1 divided into a plurality of equal sized memory blocks. However, as stated above, the stack memory region can be divided into a plurality of different sized blocks. Block 1 to block N, of FIG. 1A, are allocated when available. As illustrated in FIG. 1A, block 1 is allocated at step A, followed by block 2 at step B, then block 4 at step C, then block 3 at step D. A stack-space allocator is used to allocate the available memory blocks for storage. The memory blocks are linked together but not in a continuous direction, creating a discontinuous stack. In order to link the blocks, the current memory block stores a previous location indicator indicating the location of the previous memory block (herein referred to as PREV). In one embodiment, PREV is the address of the last used byte of the previous memory block or the address of the first free word of the previous memory block. In one embodiment, PREV is stored at the highest location, for a downwards growing stack, in each allocated memory block. The previous location indicator could also be any other indicator capable of indicating the location of the previous memory block. For an upwards growing stack, PREV is stored at the lowest location. When a stack frame is smaller than a memory block, PREV is the address of the last used byte of the previous stack frame or the address of the first free word after the previous stack frame.

When the current memory block of a call stack is the first (root) memory block of the stack, there is no previous memory block. In this special case, the previous location indicator, PREV, of the first (root) block comprises a code, such as a NULL value (a 0), indicating that it is the end of the stack.

For the avoidance of doubt, the "current" memory block is the memory block which is most recently being used for storage. The "current" memory block will in most instance have an area of storage space available for storage which can be utilised by the stack depending on the size of the next stack frame. The "previous" memory block is the memory block which was used prior to the "current" memory block. The "new" memory block is the memory block allocated after the "current" memory block. Upon allocation of a "new" memory block, the "current" memory block becomes the "previous" memory block and the "new" memory block becomes the "current" memory block. An "available" memory block is a memory block that is free for allocation and which can be selected by the stack-space allocator to be the "new" memory block.

With reference to FIG. 1A, PREV in block 1 contains the address of the last used byte of the previous stack frame (not illustrated), PREV in block 2 contains the address of the last used byte of block 1, PREV in block 4 contains the address of the last used byte of block 2, and PREV in block 3 contains the address of the last used byte of block 4. In another embodiment, PREV contains the address of the first free word of the block.

The size of each memory block is known, although the memory blocks are not required to all be the same size, therefore it is possible for the compiler to generate code capable of determining the amount of memory space available in a partially used memory block. For example, when 128 bytes of a 256 byte memory block is being used, then 128 bytes of the memory block are still available for use. The current memory block is the memory block which is currently being used. When there is free space available in the current memory block, then that free space can be used when the next stack frame requires less space than the free space available in the current memory block. For example, as illustrated in FIG. 1B, block 1 is allocated at step A, followed by block 2 at step B, then block 2 again at step C, then block 4 at step D, then block 3 at step E.

Figure 1B:
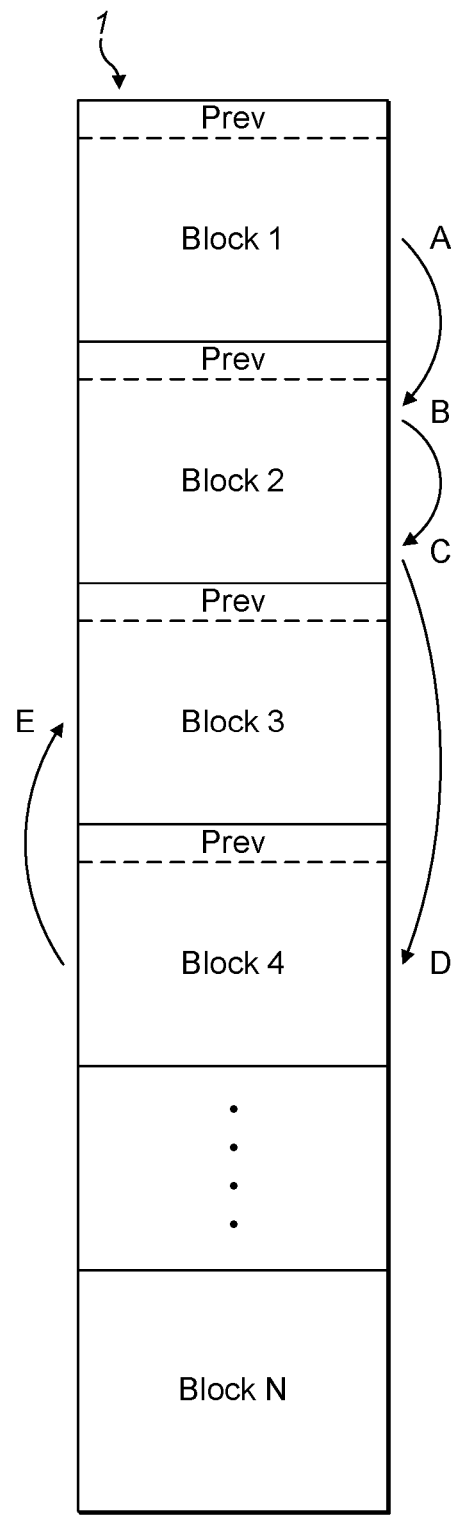

With reference to FIG. 1B, PREV in block 1 contains the address of the last used byte of the previous stack frame (not illustrated), PREV in block 2 contains the address of the last used byte of block 1, PREV in block 4 contains the address of the last used byte of block 2, used at step C, and PREV in block 3 contains the address of the last used byte of block 4.

However, when the stack frame requires more space than the free space available in the current memory block, then a new, available, memory block is allocated.

A call stack comprises a plurality of stack frames, each stack frame requiring stack memory space to be used for local storage by the current function. The amount of stack memory space required by each stack frame is known. In addition to amount of stack memory space required by the stack frame, stack memory space is also required to be allocated for an interrupt request (IRQ) after the topmost stack frame. The space for a possible interrupt needs only to be after the end of the stack (not in all the previous memory blocks) because an interrupt request may not occur. However, a predetermined amount of stack memory space, herein referred to as the interrupt allowance, is provided after each stack frame so that there is sufficient memory space available if/when an interrupt does occur. When an interrupt does not occur the predetermined amount of stack memory space allocated to the interrupt allowance can be used by the next stack frame.

The amount space allocated for an interrupt request is predetermined by the operating systems maximum allowed interrupt nesting and can vary from device to device. Although a large interrupt allowance could be provided, large interrupt functions reduce the efficiency of the system. Therefore, it is preferable to keep the interrupt allowance as small as possible. In one embodiment, the interrupt allowance is less than the size of one memory block. However, if/when an interrupt does occur the memory required for the interrupt is allocated from the stack.

The remaining space available in the current memory block can be represented as X, the space required by the stack frame of a new function can be represented as Y, and the space required by the interrupt allowance can be represented as Z.

Immediately after function entry, and at any point that additional stack memory space is required to be allocated, the compiler generates code capable of determining the amount of free space X available in the current stack memory block. The amount of free space X available in the current stack memory block can be determined from the address of the last byte used by the previous stack frame or the address of the first free word of the previous stack frame, and the known size of each memory block (herein referred to as $B_S$). As stated above, PREV (the address of the last used byte of the previous memory block or the address of the first free word of the previous memory block) is stored at the highest location in each memory block, for a downwards growing stack, and the size of each memory block $B_S$ is known. Therefore, the lowest location in each memory block can be calculated (PREV & ~($B_S$−1)). The highest address is (PREV|($B_S$−1)). The highest address excluding PREV is (PREV|($B_S$−1))−$B_S$+$B_U$, where $B_U$ represents the size of each memory block less the size of PREV.

Once the amount of free space X available in the current stack memory block has been determined, it is then possible to determine whether the next stack frame can be allocated the current memory block, or whether a new memory block should be allocated.

When the amount of free space X available in the current stack memory block is greater than or equal to the amount of space required by the stack frame Y plus the interrupt allowance Z (Equation 1.), then the stack frame is allocated the current memory block.

$$X \geq Y+Z \qquad \text{Equation 1.}$$

However, when the amount of free space X available in the current stack memory block is less than the amount of space required by the stack frame Y plus the interrupt allowance Z (Equation 2.), then the stack frame is allocated a new memory block.

$$X < Y+Z \qquad \text{Equation 2.}$$

The memory blocks are allocated based on availability, therefore it is unlikely that the blocks will be allocated sequentially.

Figure 2A:
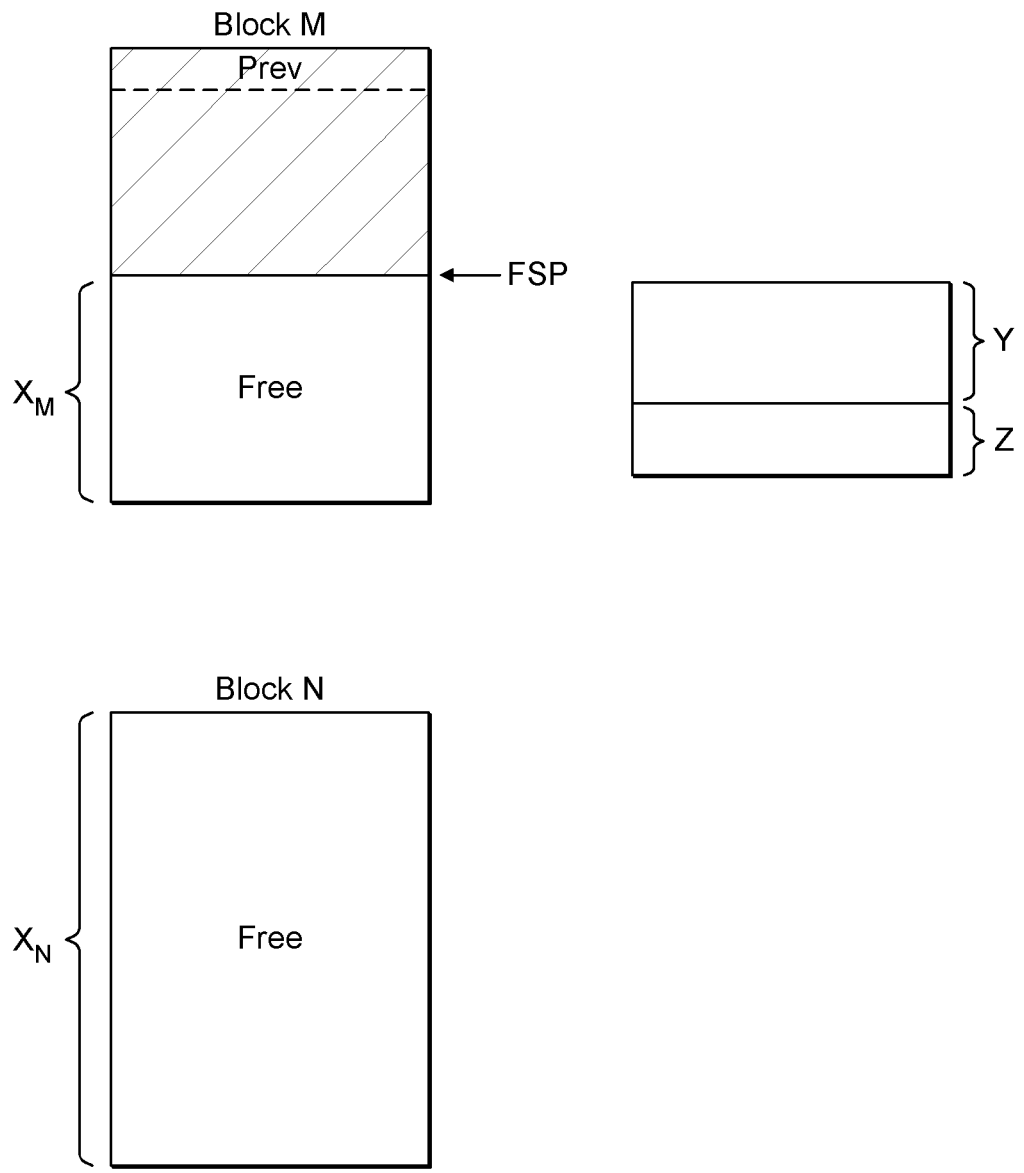
FIGS. 2A to 2D illustrate two equal sized memory blocks.
Figure 2B:
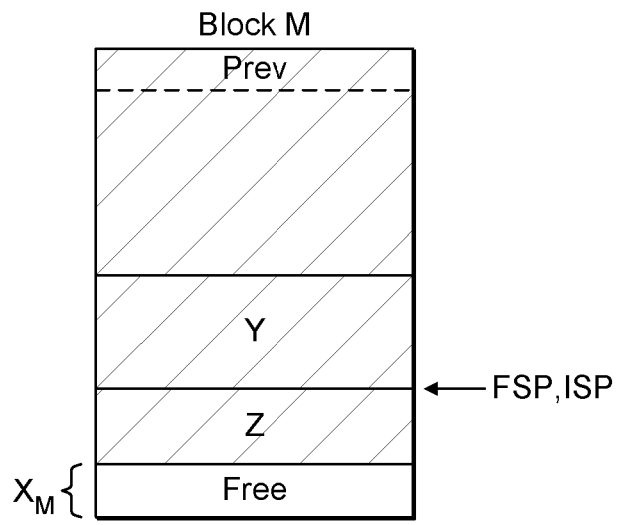
Figure 2B:
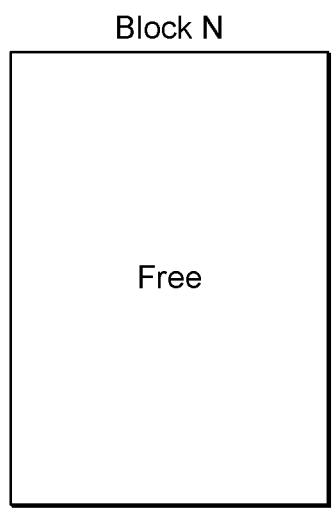

FIG. 2A illustrates two stack memory blocks, block M—the current block and block N—an available block. Block M only has part of its memory space available. When the stack frame Y is required to be allocated memory space, the compiler generates code capable of determining the amount of space $X_M$ available in the current memory block M. Y+Z is less than $X_M$, so the stack frame Y plus the interrupt allowance Z are allocated the memory space available in the current memory block M, as illustrated in FIG. 2B. The remaining free space available in block M may then be used if the memory space required by the next stack frame plus the interrupt allowance is less than $X_M$.

Figure 2C:
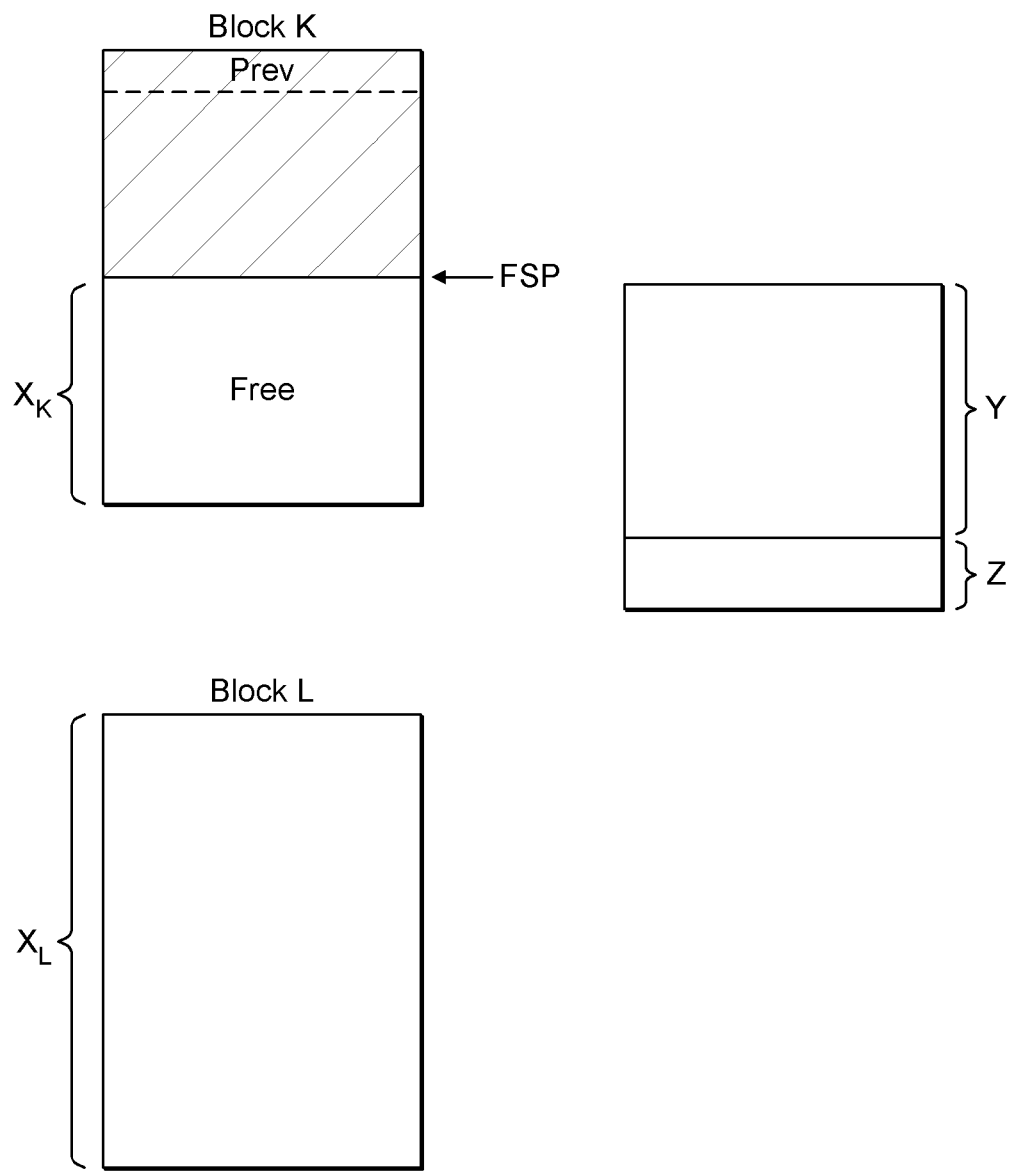
Figure 2D:
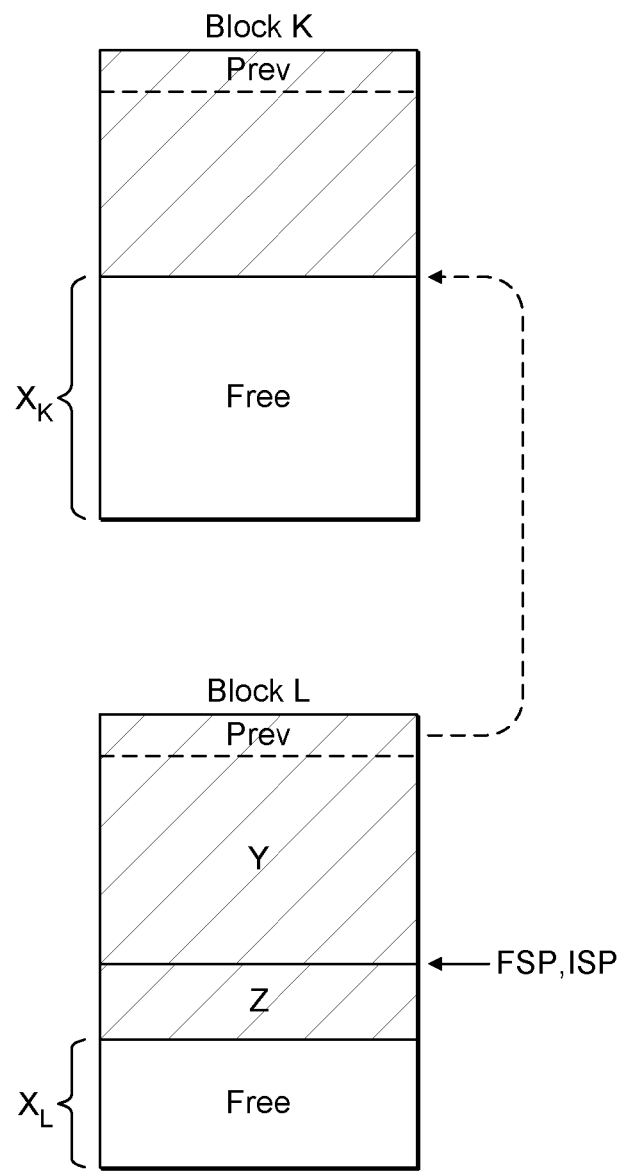

FIG. 2C illustrates two stack memory blocks, block K—the current block and block L—an available block. With reference to FIG. 2C, when the stack frame Y is required to be allocated memory space, the compiler generates code capable of determining the amount of space $X_K$ available in the current memory block K. Y+Z is greater than $X_K$, so the stack frame Y plus the interrupt allowance Z are allocated the memory space available in the available memory block L, and the block L becomes the current memory block, as illustrated in FIG. 2D. PREV of block L contains the address of the last byte used by the previous stack frame in block K or the address of the first free word after the previous stack frame in block K, indicated by the dotted line. The remaining free space available in block L may then be used if the memory space required by the next stack frame plus the interrupt allowance is less than XL.

As a result of the memory blocks being allocated based on availability, rather than sequentially from a top down or bottom up arrangement, it is not possible for a stack pointer to be incremented/decremented in order to keep track of the top of the stack. Therefore, a stack pointer register FSP is used for stack frame purposes and a stack pointer register ISP is used for interrupt allowance purposes. Although, stack pointer registers are described herein, any data store may be utilised as a stack pointer register. When an interrupt occurs, no software intervention is possible before the core writes to the stack. Therefore, a stack pointer ISP used by the interrupts is treated separately from the stack pointer FSP used by regular functions. With regular functions, code that interacts with the block allocator can be inserted.

The stack pointer register FSP is updated with a stack location indicator, indicating the top of the call stack. In one embodiment, the stack location indicator is the address of the end of the used space, used by the stack frame Y in the current memory block. In another embodiment, the stack location indicator is the address of the beginning of the free space after the stack frame Y in the current memory block. The stack location indicator could also be any other indicator capable of indicating the top of the call stack. The processor is then able to identify the current memory block from the stack location indicator stored in the stack pointer register FSP, track the top of the stack and track which memory block is the current memory block. The stack pointer register ISP points to the start of the space allocated in the memory block for an interrupt. In one embodiment, the stack pointer register ISP stores an interrupt location indicator which indicates the beginning of the space allocated in the memory block for an interrupt. The interrupt location indicator could be any indicator capable of indicating the beginning of the space allocated in the memory block for an interrupt. In one embodiment, the interrupt location indicator is the address of the beginning of the space allocated in the memory block for an interrupt if/when an interrupt occurs, the stack pointer register ISP will be incremented though this space as the interrupt is performed.

When the stack memory region is divided into a plurality of different sized blocks, then the stack location indicator can indicate the address of current memory block, as well as the address of the end of the used space/beginning of the free space in the current memory block. In another embodiment, when the stack memory region is divided into a plurality of different sized blocks, the stack location indicator indicates the address of the end of the used space/beginning of the free space in the current memory block, and a memory location indicator is saved to another data store, such as a register, the memory location indicator indicating the address of current memory block.

With reference to FIG. 2A, the current memory block M is partially used and the stack pointer FSP contains the address of the end of the used space in the current memory block M or the beginning of the free space in the current memory block. When the stack frame Y plus the interrupt allowance Z is allocated the memory space available in the current memory block M, as illustrated in FIG. 2B, the stack pointer register FSP is updated with the address of the end of the space used by the stack frame Y or with the address of the beginning of the free space after the stack frame Y in the current memory block M.

With reference to FIG. 2C, the current memory block K is partially used and the stack pointer register FSP contains the address of the end of the used space or the beginning of the free space in the current memory block K. When the stack frame Y plus the interrupt allowance Z is allocated the memory space available in the memory block L, as illustrated in FIG. 2D, PREV (the address of the last used byte of the previous memory block K or the address of the first free word of the previous memory block K) is stored at the highest location in the current memory block L, and the stack pointer register FSP is updated with the address of the end of the space used by the stack frame Y or with the address of the beginning of the free space after the stack frame Y in the memory block L, which has become the current memory block.

In both FIGS. 2B and 2D, the stack pointer register ISP is updated with the address of the end of the space used by the stack frame Y in the current memory block M/L respectively. In another embodiment, the stack pointer register ISP points to the start of the space allocated in the memory block M/L respectively for an interrupt.

Figure 3:
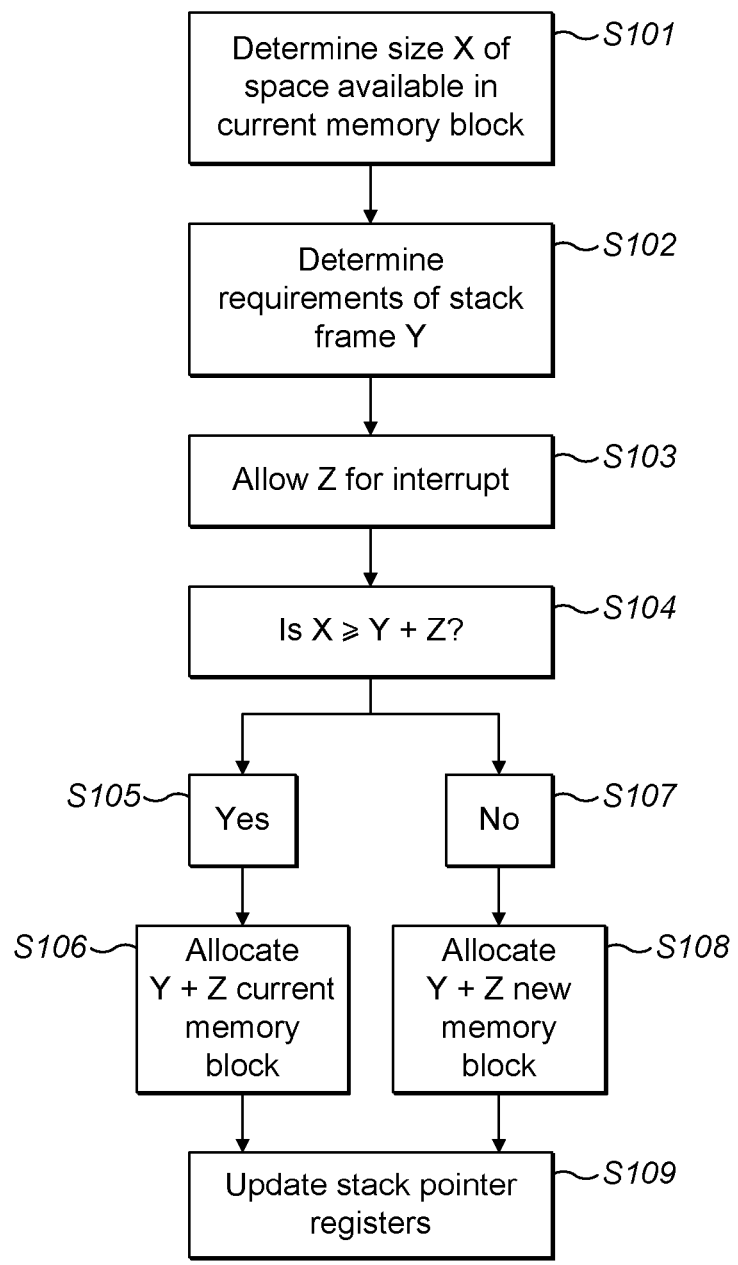
FIG. 3 illustrates a method for allocating memory blocks.

FIG. 3 illustrates a method for allocating memory blocks. Immediately after function entry, and at any point that additional stack memory space is required to be allocated, the method of FIG. 3 begins. At step S101 the amount X of stack memory space available in the current memory block is determined. At step S102 the amount Y of memory space required by the next stack frame is determined. At step S103 the amount Z of memory space required for an interrupt is allocated. At step S104 it is determined whether X≥Y+Z (Equation 1.). At step S105 it is determined that the space X available in the current memory block is greater than or equal to the space required by the next stack frame Y plus the interrupt allowance Z. The next stack frame Y plus the interrupt allowance Z are allocated the current memory block at step S106. Alternatively, at step S107 it is determined that the space X available in the current memory block is less than the space required by the next stack frame Y plus the interrupt allowance Z. Therefore, the next stack frame plus the interrupt allowance Z are allocated a new memory block at step S108. Finally, at step S109 the stack frame is executed, the current memory block becomes the previous memory block, PREV is stored at the highest location in the new memory block which becomes the current memory block, and the stack pointer registers (FSP and ISP) are updated.

In order to more efficiently use the space in each memory block, it is possible to split the stack frame Y and the interrupt allowance Z between the free space available in the current memory block and a new memory block. However, the interrupt allowance Z should not be split over two memory blocks.

When the amount of free space X available in the current stack memory block is less than the amount of space required by the stack frame Y plus the interrupt allowance Z (Equation 2.), but the amount of free space X available in the current memory block is greater than or equal to the amount of space required by the stack frame Y (Equation 3.), then the stack frame Y is allocated the current memory block and the interrupt allowance Z is allocated a new memory block.

$$X \geq Y \qquad \text{Equation 3.}$$

However, when the amount of free space X available in the current stack memory block is less than the amount of space required by the stack frame Y (Equation 4.), then the stack frame Y plus the interrupt allowance Z are allocated a new memory block.

$$X < Y \qquad \text{Equation 4.}$$

Figure 4A:
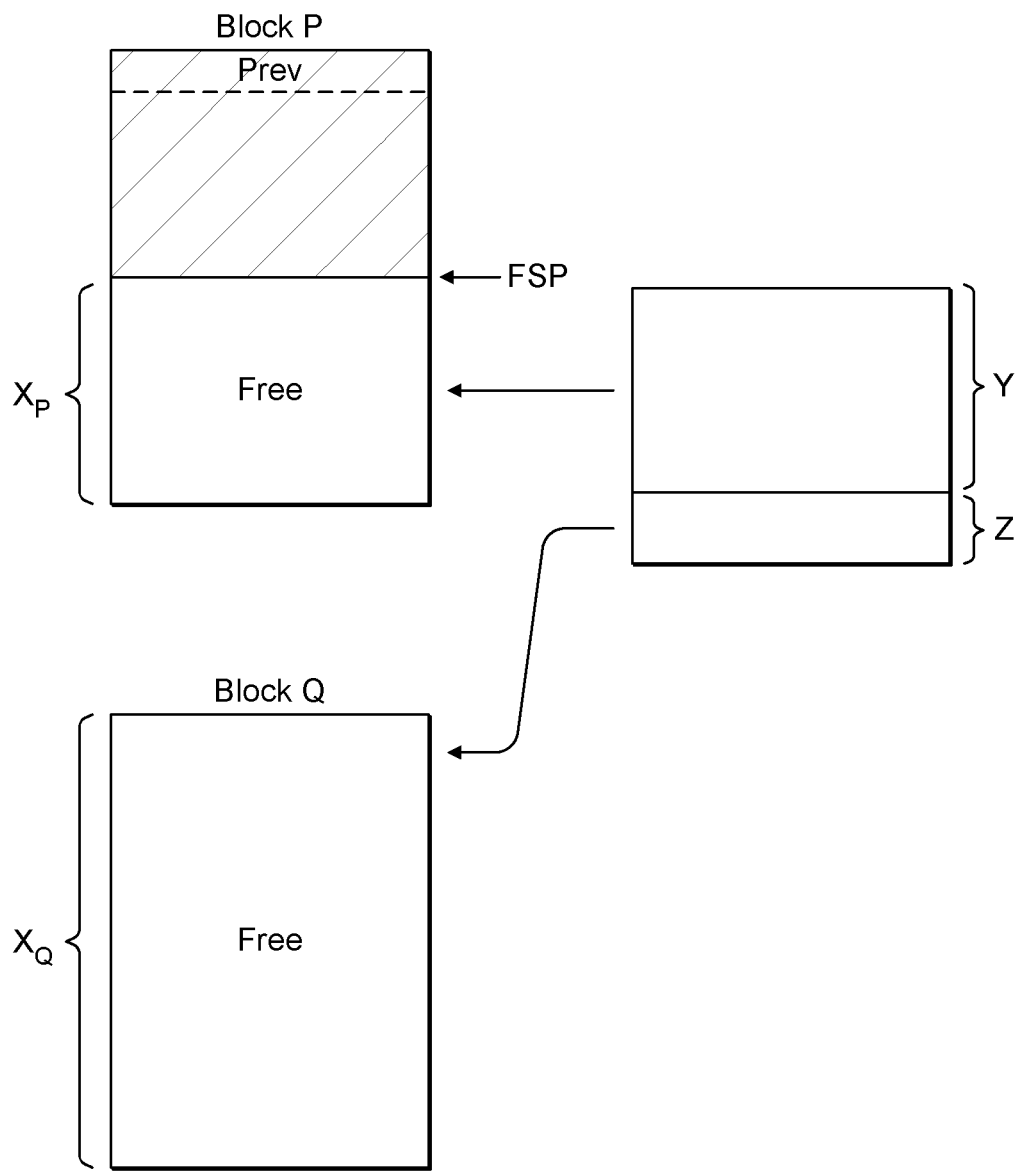
FIGS. 4A and 4B illustrate two equal sized memory blocks.
Figure 4B:
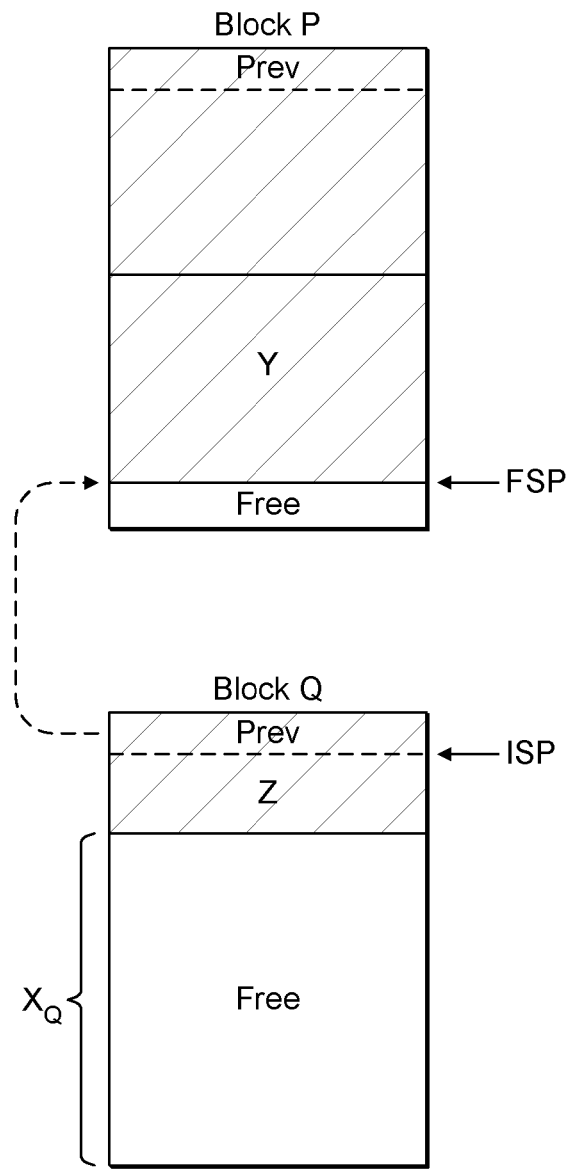

FIG. 4A illustrates two stack memory blocks, block P—the current memory block and block Q—an available memory block. Block P only has part of its memory space $X_P$ available. The stack pointer register FSP contains the address of the end of the used space or the beginning of the free space in memory block P. When the stack frame Y is required to be allocated memory space, the compiler generates code capable of determining the amount of space $X_P$ available in the current memory block P. Y+Z is greater than $X_P$. However, Y is less than $X_P$. Therefore, as illustrated in FIG. 4B, the stack frame Y is allocated the memory space available in the current memory block P and the interrupt allowance Z is allocated a new memory block, block Q. The stack pointer register FSP is updated with the address of the end of the space used by the stack frame Y or with the address of the beginning of the free space after the stack frame Y in memory block P.

The interrupt allowance Z is allocated to the beginning of a memory block Q and the stack pointer register ISP is updated with the address of the current memory block, memory block Q. The interrupt allowance Z is the space reserved for interrupts, so the stack pointer register ISP points to the start of this space in memory block Q, until/unless an actual interrupt occurs, at which point the stack pointer register ISP will be incremented though the space in memory block Q as the interrupt is performed. PREV of memory block Q contains the address of the last byte used by the previous stack frame Y in block P or the address of the first free word after the previous stack frame Y in block P, indicated by the dotted line.

The remaining space available in the memory block P, after the stack frame Y can still be used, if no interrupt occurs. For example, when the next stack frame $Y_{+1}$ is required to be allocated memory space, the compiler generates code capable of determining the amount of space $X_{P+1}$ available in the memory block P after the stack frame Y. $Y_{+1}+Z$ is greater than $X_{P+1}$. However, $Y_{+1}$ is less than $X_{P+1}$. Therefore, the stack frame $Y_{+1}$ is allocated the memory space available in the memory block P after the stack frame Y. The stack pointer register FSP is updated with the address of the end of the space used by the stack frame $Y_{+1}$ or with the address of the beginning of the free space after the stack frame $Y_{+1}$ in memory block P. In addition, PREV of memory block Q contains the address of the last byte used by the stack frame $Y_{+1}$ in block P or the address of the first free word after the stack frame $Y_{+1}$ in block P. The interrupt allowance Z is allocated to the beginning of a memory block Q and the stack pointer register ISP unchanged, it contains the address of the current memory block, memory block Q.

The remaining free space available in block Q may then be used if the memory space required by the next stack frame plus the interrupt allowance is less than $X_Q$. Consequently, it is possible to allocate more stack frames Y into the remaining free space of the memory block even after Y and Z have been split between two memory blocks.

FIGS. 2C and 2D illustrate when Y+Z is greater than $X_K$ and Y is greater than $X_K$. In this scenario, the stack frame Y and the interrupt allowance Z are allocated the memory space available in the available memory block L. The remaining space available in block K ($X_K$) cannot be used until block L is freed (i.e. the data stored in block L is no longer required so block L is considered available again).

Figure 5:
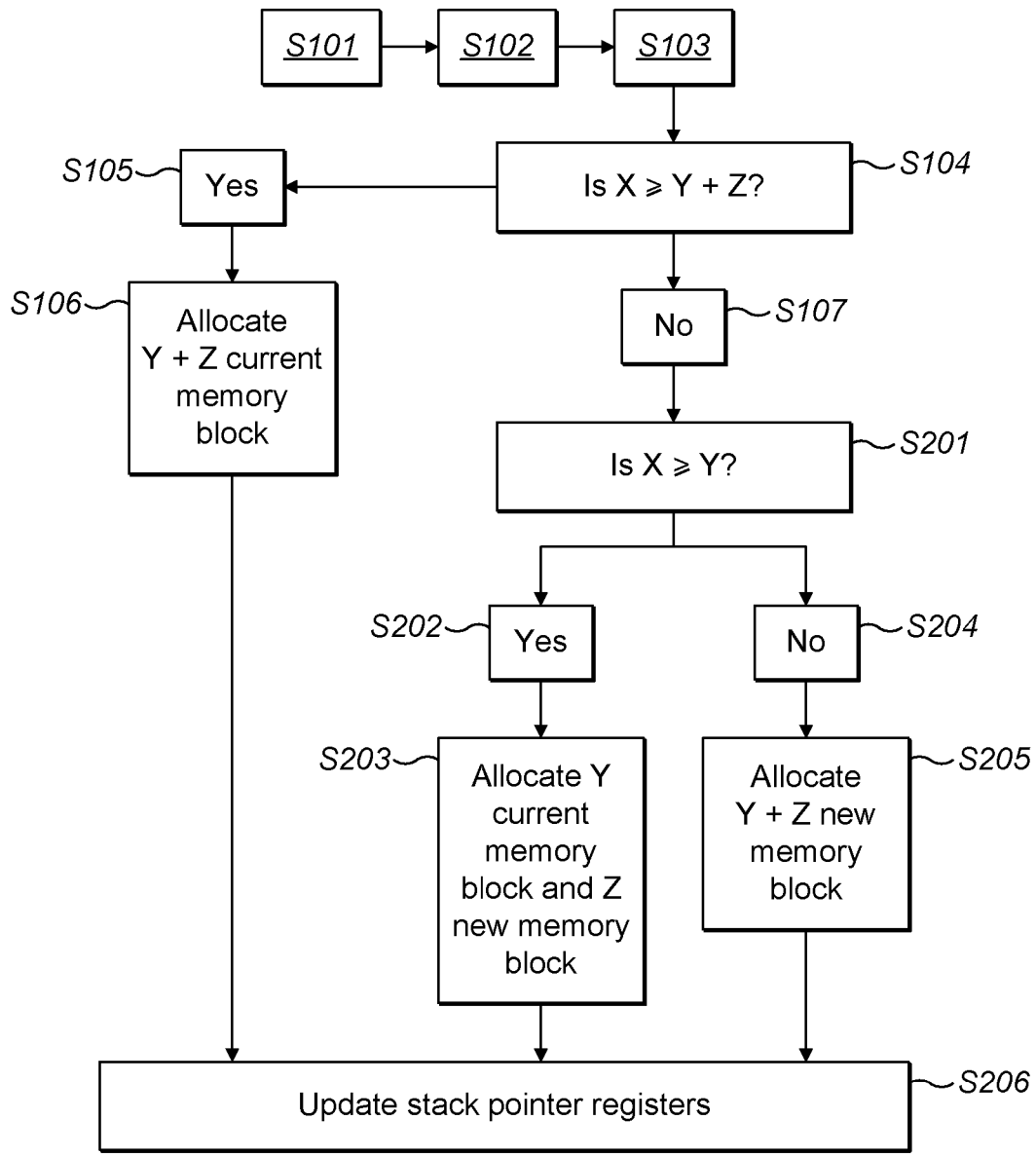
FIG. 5 illustrates a method for allocating memory blocks.

FIG. 5 illustrates another method for allocating memory blocks. In FIG. 5, steps S101 to S107 are equivalent to the corresponding steps illustrated in, and described with reference to, FIG. 3. At step S101 the amount X of memory space available in the current memory block is determined. At step S102 the amount Y of memory space required by the next stack frame is determined. At step S103 the amount Z of memory space required for interrupt(s) is allocated. At step S104 it is determined whether X≥Y+Z (Equation 1.). When it is determined at step S105 that the space X available in the current memory block is greater than or equal to the space required by the next stack frame Y plus the interrupt allowance Z, then the next stack frame Y plus the interrupt allowance Z are allocated the current memory block at step S106. The stack frame is executed and the stack pointer registers, FSP and ISP, are updated at step S206.

Alternatively, when it is determined at step S107 that the space X available in the current memory block is less than the space required by the next stack frame Y plus the interrupt allowance Z, then the method moves onto step S201. At step S201 it is determined whether X≥Y (Equation 3.). When it is determined at step S202 that the space X available in the current memory block is greater than or equal to the space required by the next stack frame Y, then the next stack frame is allocated the current memory block and the interrupt allowance Z is allocated a new memory block at step S203. The stack frame is executed, PREV is stored at the highest location in the new memory block, and the stack pointer registers are updated at step S206.

However, when it is determined at step S204 that the space X available in the current memory block is less than the space required by the next stack frame Y, then the next stack frame Y and the interrupt allowance Z are allocated a new memory block at step S205. The stack frame is executed, PREV is stored at the highest location in the new memory block, and the stack pointer registers are updated at step S206.

FIGS. 2 to 5, assume that a stack frame Y plus the interrupt allowance Z require storage space that is less than or equal to the amount of storage space provided by one memory block, represented as $B_U$ (Equation 5.).

$$Y+Z \leq B_U \qquad \text{Equation 5.}$$

The size of each memory block is referred to as $B_S$. However, since each memory block stores the address of the last byte used by the previous memory block or the address of the first free word of the previous memory block (PREV), the actual amount of storage space available in one memory block, represented as $B_U$, is less than the size of each memory block $B_S$.

It is possible for a stack frame Y plus the interrupt allowance Z to require more storage space than provided by one memory block. When the amount of space required by the stack frame Y plus the interrupt allowance Z is greater than the amount of storage space available in one memory block $B_U$ (Equation 6.), then the stack frame plus the interrupt allowance Z are allocated two (or more) memory blocks.

$$Y+Z > B_U \qquad \text{Equation 6.}$$

Although it is also possible to allocate more than two memory blocks to a stack frame, it is not desirable to have large objects stored to the stack. Therefore, in most instances no more than two memory blocks should be required per stack frame plus interrupt allowance.

The blocks of the stack memory are not required to be allocated in sequential order, the memory blocks are allocated based on availability. Therefore, it is unlikely that two sequential memory block would be available at the same time. Consequently, when two blocks are required for one stack frame, which are unlikely to be positioned next to each other, the compiler generates code capable of splitting the stack frame and interrupt allowance over the two (or more) memory blocks.

Figure 6A:
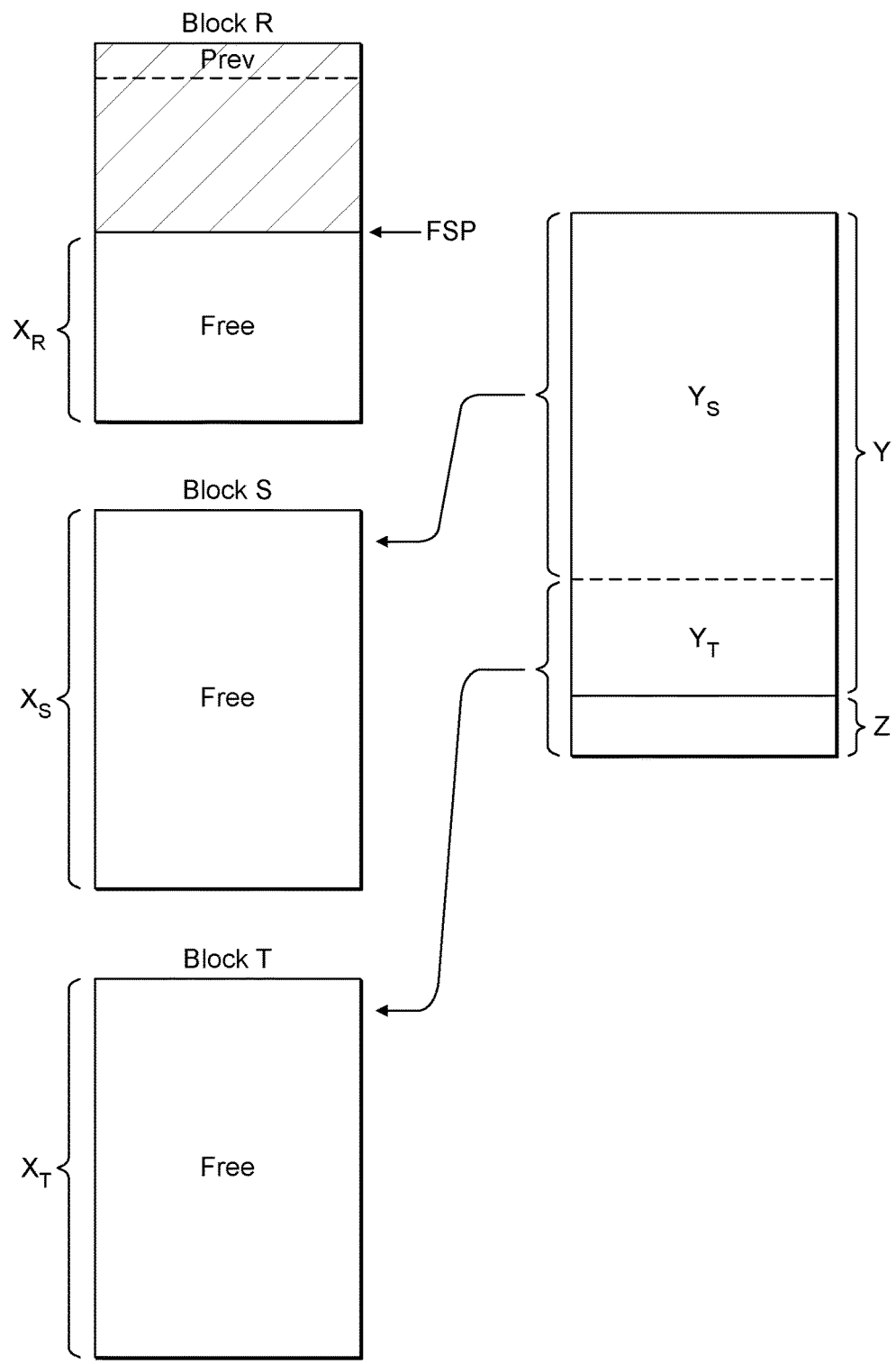
FIGS. 6A to 6C illustrate three equal sized memory blocks.
Figure 6B:
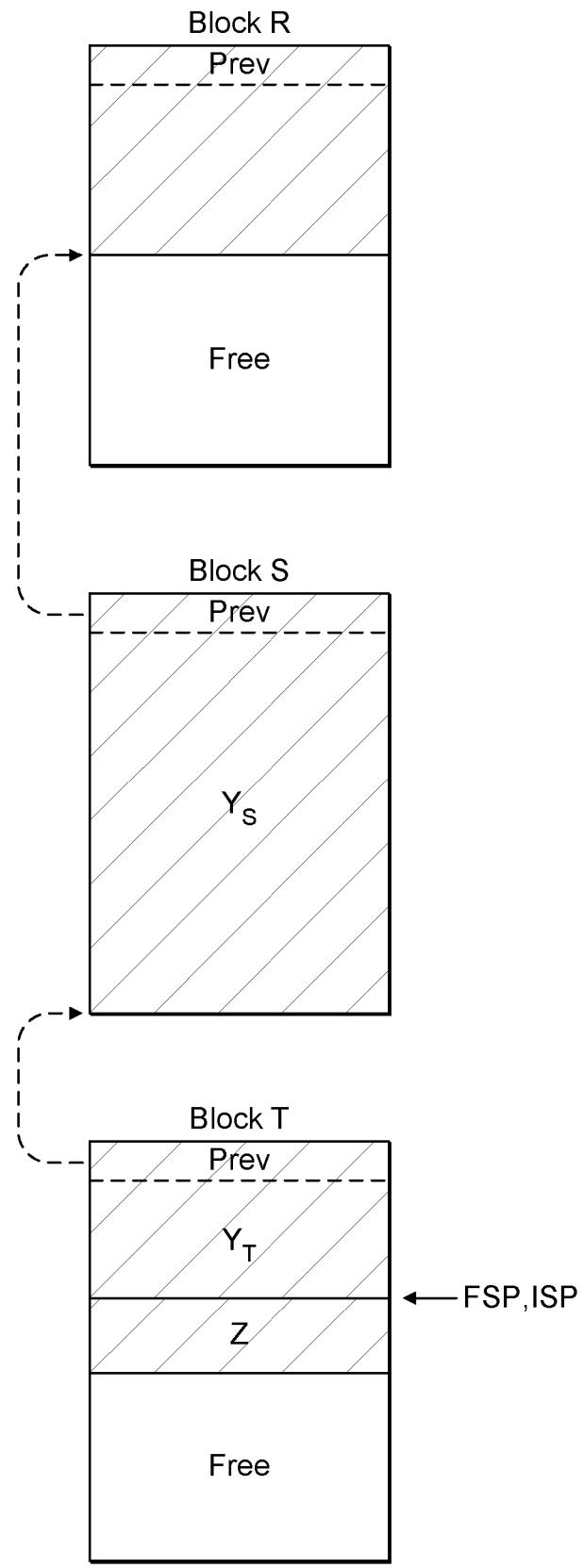

FIG. 6A illustrates three memory blocks, block R—the current block, and block S and block T—two available blocks. Block R only has part of its memory space available $X_R$. When the stack frame Y is required to be allocated memory space, the compiler generates code capable of determining the amount of space $X_R$ available in the current memory block R. Y+Z is greater than $X_R$, in addition, Y is greater than $X_R$. Therefore, the stack frame Y is allocated a new memory block, block S. However, Y+Z is greater than the amount of storage space available in one memory block $B_U$ (Equation 6.). Therefore, the complier generates code capable of splitting the stack frame Y such that part of the stack frame $Y_S$ is allocated the memory space available in memory block S and part of the stack frame $Y_T$ plus the interrupt allowance Z is allocated the memory block T. As illustrated in FIG. 6B, part of the stack frame $Y_S$ is allocated the memory space starting at the beginning of block S, after PREV, and filling block S, and part of the stack frame $Y_T$ plus the interrupt allowance Z is allocated the memory space starting at the beginning of block T, after PREV. The stack frame Y starts at the beginning of the block because starting at the beginning of a new block is simpler and more efficient (the compiler can generate code knowing that it has $B_U$ worth of continuous space) and the compiler can make guarantees about continuous blocks of memory. PREV of block S contains the address of the last used byte of the previous stack frame in block R or the address of the first free word after the previous stack frame in block R. PREV of block T contains the address of the last used byte of the previous memory block, block S. The stack pointer registers FSP and ISP are updated with the address of the end of the space used by the stack frame $Y_T$, or with the address of the beginning of the space available after the stack frame $Y_T$ in the memory block T, which has become the current memory block.

However, in another embodiment, not illustrated, the complier splits the stack frame Y such that part of the stack frame $Y_R$ is allocated the memory space available in the current memory block R, part of the stack frame $Y_S$ is allocated the memory space available in the memory block S (after PREV) and filling block S, and part of the stack frame $Y_T$ plus the interrupt allowance Z is allocated the memory block T. In this instance, PREV of block S contains the address of the last used byte of the previous memory block, block R and PREV of block T contains the address of the last used byte of the previous memory block, block S. The stack pointer registers FSP and ISP are updated with the address of the end of the space used by the stack frame $Y_T$, or with the address of the beginning of the space available after the stack frame $Y_T$ in the memory block T, which has become the current memory block.

In some circumstances the compiler may know that it has to allocate space for a stack variable which takes up a certain amount of continuous stack space. In this embodiment, the stack frame Y starts at the beginning of the new block.

Figure 6C:
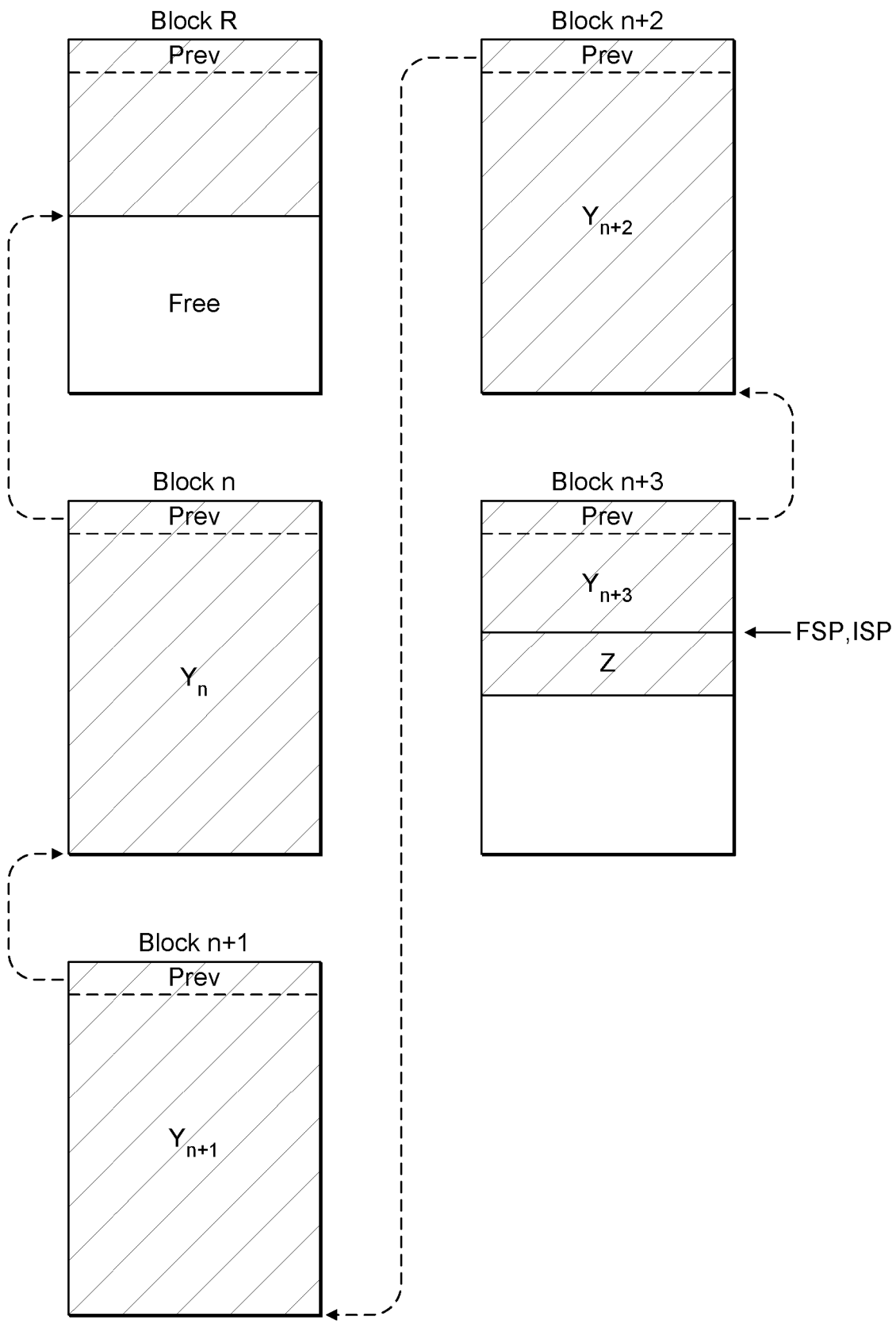

Although FIGS. 6A and 6B illustrate a stack frame Y being less than the amount of storage space provided by two memory blocks, it is possible to allocate as many memory blocks as necessary to store Y, as illustrated in FIG. 6C, which illustrates the stack frame requiring n blocks. In block n PREV is set to the address of the end of the space used or the beginning of the space available in memory block R, then in block n+1 PREV is set to the address of the end of the space used in memory block n, in block n+2 PREV is set to the address of the end of the space used in memory block n+1, and in block n+3 PREV is set to the address of the end of the space used in memory block n+2. The stack pointer registers FSP and ISP are updated with the address of the end of the space used by the stack frame or with the address of the beginning of the space available in the memory block n+3, which has become the current memory block.

As stated above, splitting the interrupt allowance Z over two memory blocks should be avoided. Therefore, when Y+Z is greater than the amount of storage space provided by one memory block $B_U$, it is determined whether the stack frame Y is less than the amount of storage space available in one memory block $B_U$ (Equation 7.)

$$Y < B_U \qquad \text{Equation 7.}$$

When the amount of space required by the stack frame Y plus the interrupt allowance Z is greater than the amount of storage space available in one memory block $B_U$ (Equation 6.), but the stack frame requires less than the amount of storage space available in one memory block $B_U$ (Equation 7.), then the complier generates code capable of splitting the stack frame Y plus the interrupt allowance Z such the stack frame Y is allocated one memory block and the interrupt allowance Z is allocated another memory block.

Figure 7A:
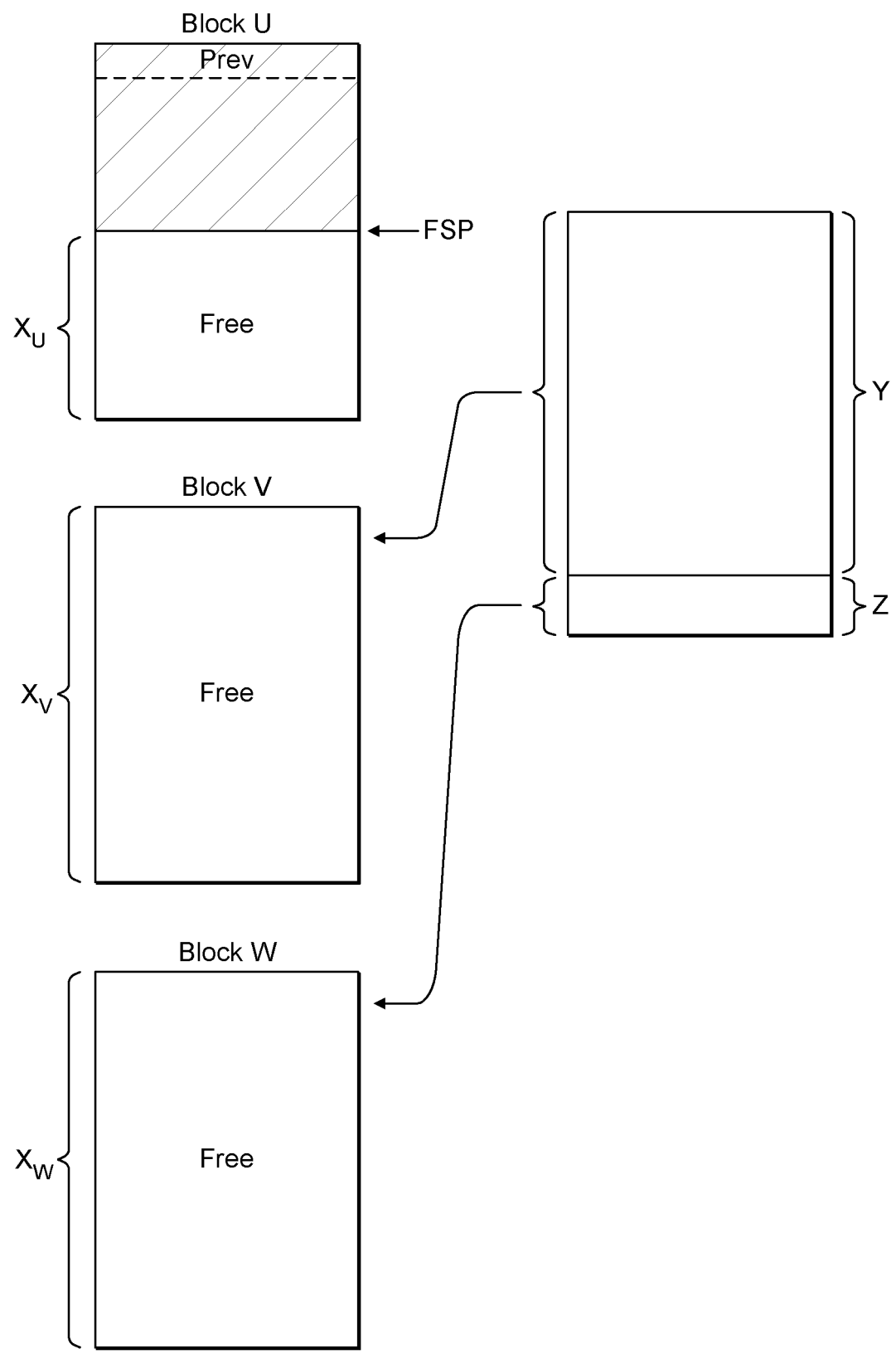
FIGS. 7A to 7C illustrate three equal sized memory blocks.
Figure 7B:
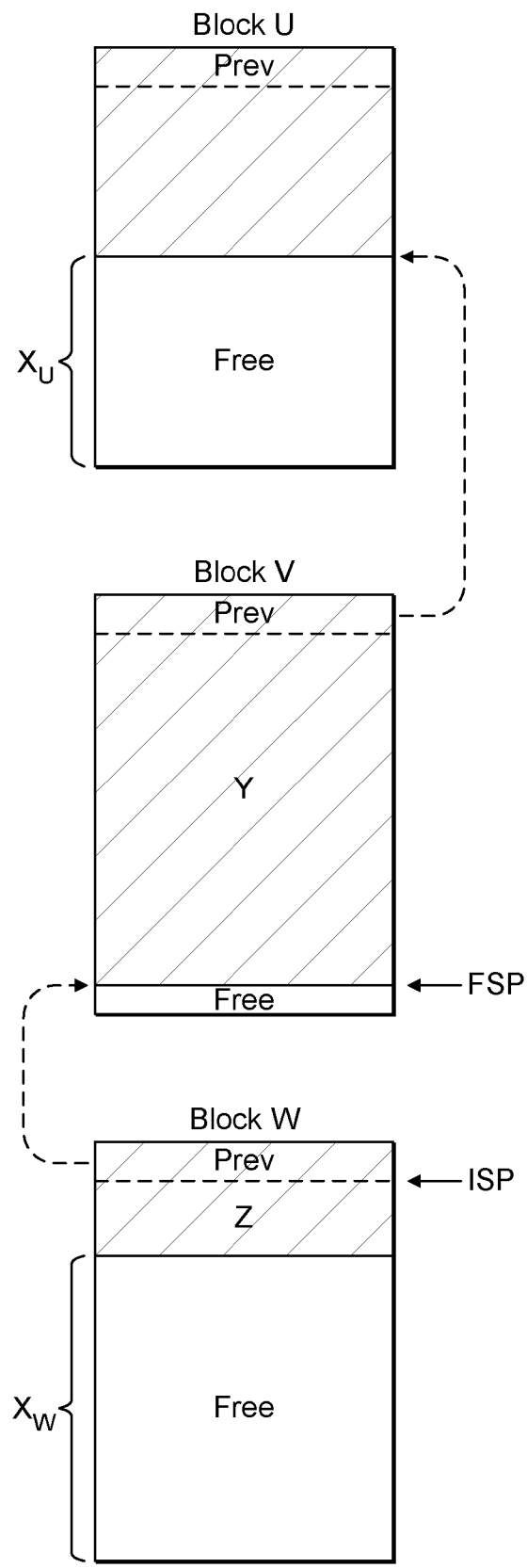

FIG. 7A illustrates three memory blocks, block U—the current block, and block V and block W—two available blocks. Block U only has part of its memory space available $X_U$. When the stack frame Y is required to be allocated memory space, the compiler generates code capable of determining the amount of space $X_U$ available in the current memory block U. Y+Z is greater than $X_U$, in addition, Y is greater than $X_U$. Therefore, the stack frame Y is allocated a new memory block, block V. Y+Z is greater than the amount of storage space available in one memory block $B_U$ (Equation 6.), but Y is less than the amount of storage space available in one memory block $B_U$ (Equation 7.). Therefore, the complier generates code capable of splitting the stack frame Y plus the interrupt allowance Z such the stack frame Y is allocated the memory space available in memory block V and the interrupt allowance Z is allocated the memory space available in the memory block W. As illustrated in FIG. 7B, the stack frame Y is allocated memory space in memory block V, starting at the beginning of block V, however, since Y is less than the amount of storage space available in one memory block, part of block V is left free. In addition, the interrupt allowance Z is allocated the memory space starting at the beginning of block W, after PREV, and the remainder of block W is free. The stack pointer register FSP is updated with the address of the end of the space used by the stack frame Y or with the address of the beginning of the space available after the stack frame Y in the memory block V and the stack pointer register ISP is updated with the address of the current memory block. The remaining free space available in block W may then be used when the memory space required by the next stack frame plus the interrupt allowance is less than $X_W$. The remaining space available in block U ($X_U$) cannot be used until block V is freed (i.e. the data stored in block V is no longer required so that block V is considered available).

Figure 7C:
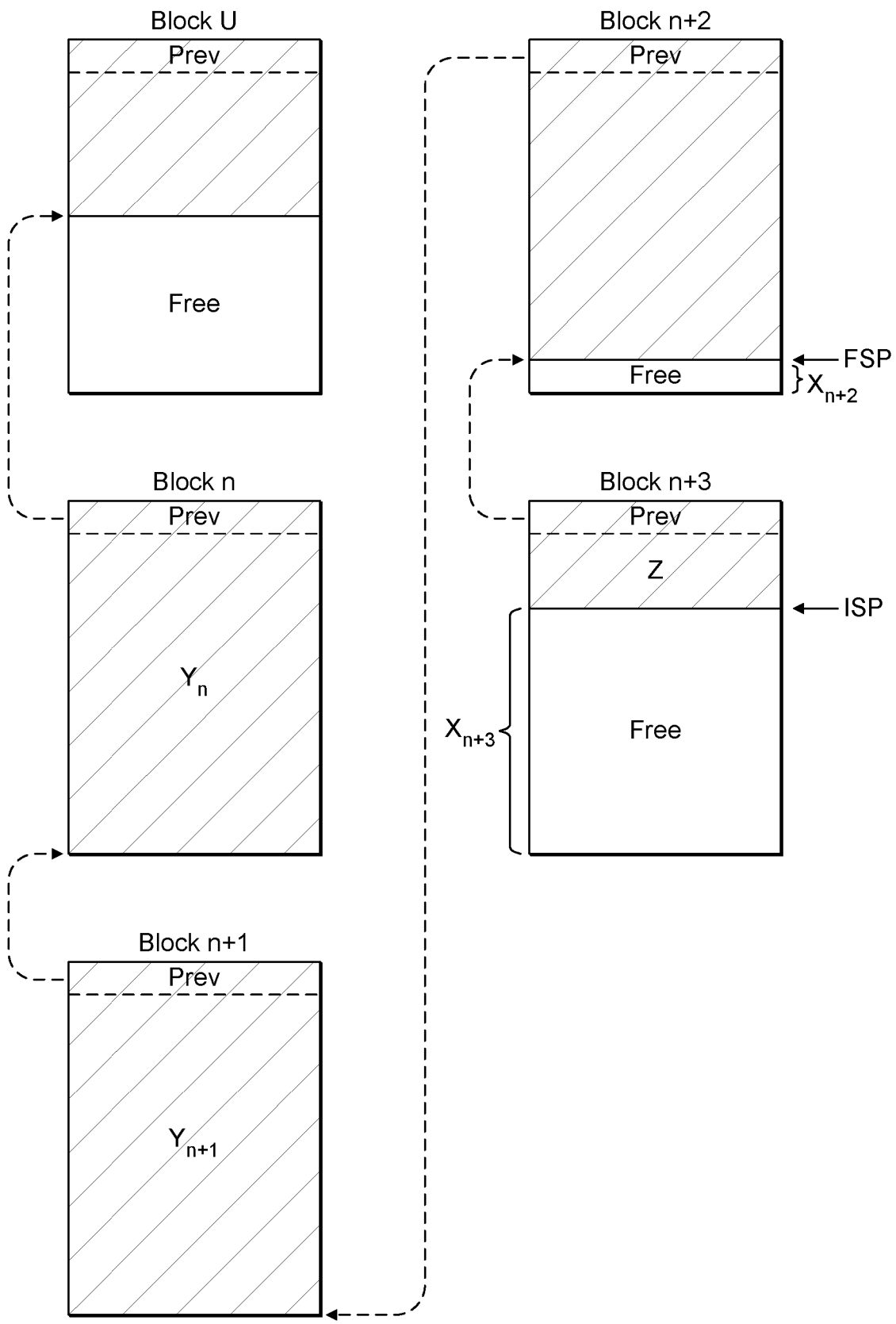

FIG. 7B illustrates a stack frame Y requiring less than the amount of storage space available in one memory block $B_U$, however, it is possible to allocate as many memory blocks as necessary to store Y, as illustrated in FIG. 7C. In block n, PREV is set to the address of the end of the space used or the beginning of the space available in memory block U, then in block n+1, PREV is set to the address of the end of the space used in memory block n, in block n+2, PREV is set to the address of the end of the space used in memory block n+1, and in block n+3, PREV is set to the address of the end of the space used by the stack frame or the beginning of the space available after the stack frame in block n+2. In order to avoid splitting the interrupt allowance Z over two memory blocks, the interrupt allowance has been allocated the top of the next available memory block, block n+3, after PREV. The stack pointer register FSP is updated with the address of the end of the space used by the stack frame Y or with the address of the beginning of the space available after the stack frame Y in the memory block n+2 and the stack pointer register ISP is updated with the address of the current memory block. The remaining free space available in block n+3 may then be used when the memory space required by the next stack frame plus the interrupt allowance is less than $X_{n+3}$. The remaining space available in block n+2 ($X_{n+2}$) cannot be used until block n+3 is freed (i.e. the data stored in block n+3 is no longer required so block n+3 is considered available).

In order to avoid splitting the interrupt allowance Z over two memory blocks, when Y+Z is greater than the amount of storage space available in one memory block $B_U$, and Y is greater than the amount of storage space available in one memory block $B_U$, it is determined how many memory blocks are required for Y. It is then determined whether there is enough space available in the memory block for the interrupt allowance together with (part of) the stack frame, or whether the interrupt allowance is to be allocated the top of the next available memory block after PREV.

Figure 8:
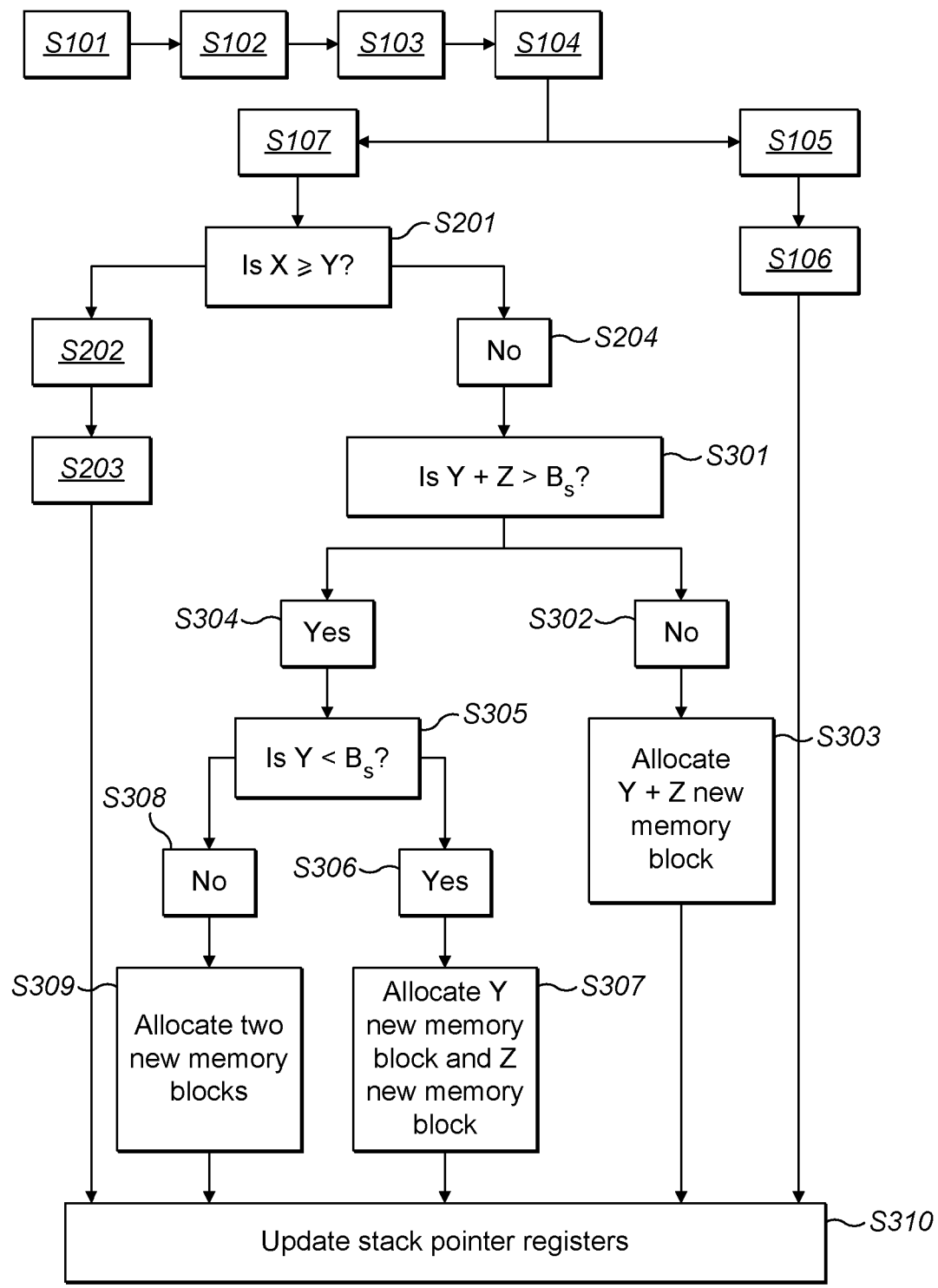
FIG. 8 illustrates a method for allocating memory blocks.

FIG. 8 illustrates a method for allocating memory blocks. In FIG. 8, steps S101 to S106 are equivalent to the corresponding steps illustrated in, and described with reference to, FIGS. 3 and 5. At step S101 the amount X of memory space available in the current stack memory block is determined. At step S102 the amount Y of memory space required by the next stack frame is determined. At step S103 the amount Z of stack memory space required for interrupt(s) is allocated. At step S104 it is determined whether $X \geq Y+Z$ (Equation 1.). When it is determined at step S105 that the space available in the current memory block is greater than or equal to the space required by the next stack frame Y plus the interrupt allowance Z, then the next stack frame Y plus the interrupt allowance Z are allocated to the current memory block at step S106. The method then moves onto step S310, the stack frame is executed and the stack pointer registers are updated.

However, when it is determined at step S107 that the space available in current memory block is less than the space required by the next stack frame Y plus the interrupt allowance Z, then the method moves onto step S201. At step S201 it is determined whether $X \geq Y$ (Equation 3.). When it is determined at step S202 that the space X available in the current memory block is greater than or equal to the space required by the next stack frame Y, then the next stack frame is allocated the current memory block and the interrupt allowance Z is allocated a new memory block at step S203. The stack frame is executed, PREV is stored at the highest location in the new memory block, and the stack pointer registers are updated at step S310.

However, when it is determined at step S204 that the space X available in the current memory block is less than the space required by the next stack frame Y, then the method moves onto step S301. At step S301 it is determined whether $Y+Z>B_U$ (Equation 6.). When it is determined at step S302 that the space required by the next stack frame Y plus the interrupt allowance Z is less than or equal to the amount of storage space available in one memory block $B_U$, then the next stack frame Y plus the interrupt allowance Z are allocated a new memory block at step S303. The method then moves onto step S310, the stack frame is executed, PREV is stored at the highest location in the new memory block, and the stack pointer registers are updated.

However, when it is determined at step S304 that the space required by the next stack frame Y plus the interrupt allowance Z is greater than the amount of storage space available in one memory block $B_U$, then the method moves onto step S305. At step S305 it is determined whether $Y<B_U$ (Equation 7.). When the amount of space required by the stack frame Y plus the interrupt allowance Z is greater than the amount of storage space available in one memory block, and it is determined at step S306 that the amount of space required by the stack frame Y is less than the amount of storage space available in one memory block, then the stack frame Y is allocated one new memory block and the interrupt allowance Z is allocated another new memory block at step S307. The method then moves onto step S310, the stack frame is executed, PREV is stored at the highest location in the new memory block(s), and the stack pointer registers are updated.

However, when the amount of space required by the stack frame Y plus the interrupt allowance Z is greater than the amount of storage space available in one memory block, and it is determined at step S308 that the amount of space required by the stack frame Y is greater than or equal to the amount of storage space available in one memory block, then the stack frame Y plus the interrupt allowance Z are allocated two (or more) new memory blocks at step S309. The method then moves onto step S310, the stack frame is executed, PREV is stored at the highest location in the new memory block(s), and the stack pointer registers are updated.

In most instances a stack frame should not require more than two memory blocks. However, when a stack frame Y plus the interrupt allowance Z is greater than the amount of storage space available in two memory blocks, then the stack frame is allocated the required number of memory blocks. In order to avoid splitting the interrupt allowance over two memory blocks, the interrupt allowance is either allocated the current memory block together with the final part of the stack frame, as illustrated in FIG. 6C, or the interrupt allowance allocated its own memory block as illustrated in FIG. 7C.

The memory blocks are allocated by a stack-space allocator. The stack-space allocator keeps track of the free memory blocks it has available. Code generated by the compiler requests a free block, or frees a block that is no longer needed as required. In one embodiment, a block is freed, and therefore becomes "available" when both stack pointers FSP and ISP exit the block.

Figure 9:
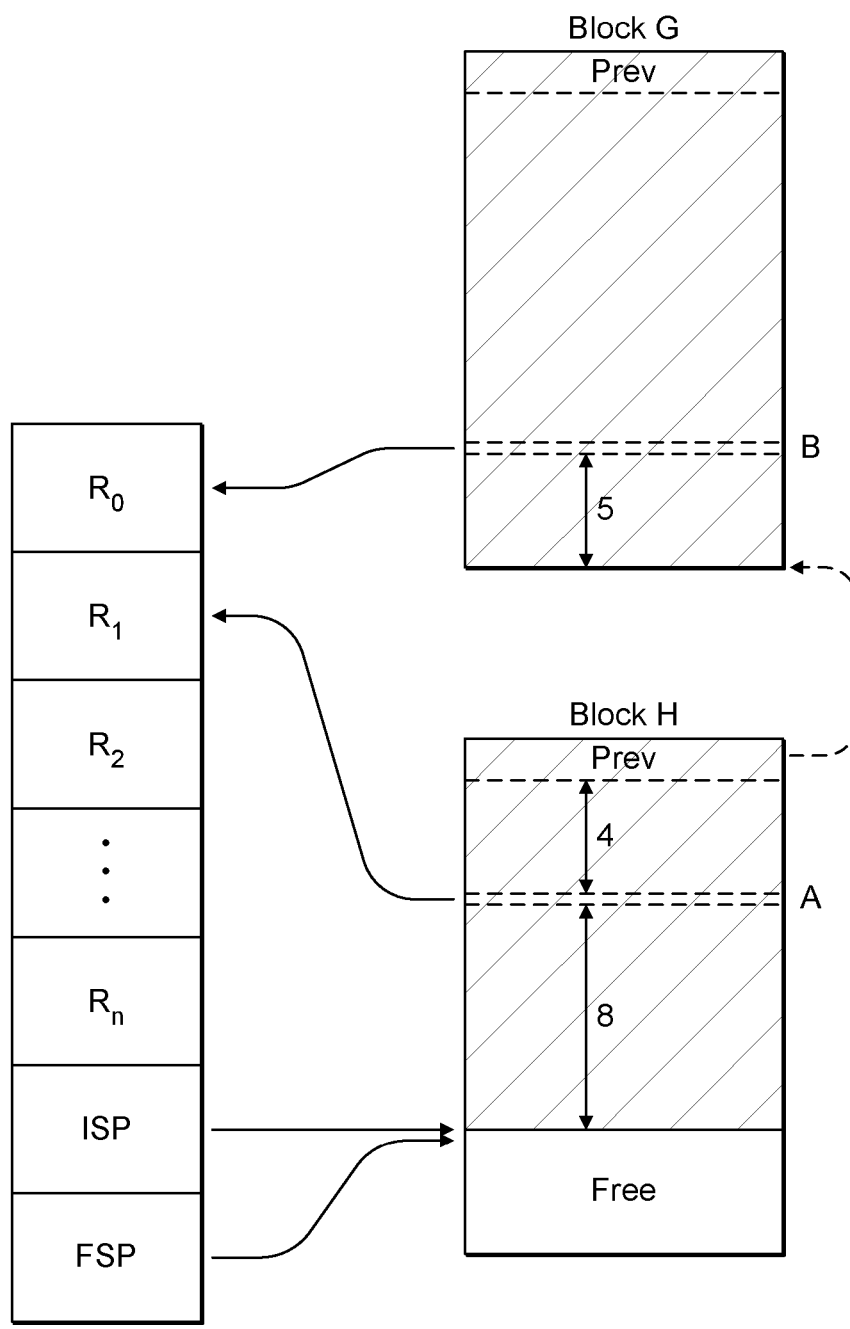
FIG. 9 illustrates a register and two equal sized memory blocks.

It is possible to access a variable stored in a stack memory block, the variable being stored at an offset from the current stack pointer FSP. For example, FIG. 9 illustrates a variable A stored at an offset of 8 from the end of the used space in the memory block H being popped off the stack to the data store $R_1$, for example a register. The memory block H is the current memory block and the stack pointer register FSP contains the address of the end of the used space in the memory block H. The offset is within the current stack frame, and the current stack frame occupies less than the amount of storage space provided by one memory block (i.e. block H contains the entire stack frame). Therefore, one example of code which could be used to pop the variable off the stack to the register $R_1$ is: $Id_R$ $R_1$ (FSP+8). The data is copied from the stack memory block H, at position FSP+8 (the offset) to the register $R_1$.

However, when a variable needs to be accessed at an offset which is outside the current stack frame or the stack frame occupies more than the amount of storage space provided by one memory block, then an offset calculation occurs.

1. An offset pointer is set to equal the current stack pointer FSP (OffsetPtr=FSP)
2. When the Offset is greater than the space used in current memory block:
   2a) Offset=Offset—space used in current memory block
   2b) The offset pointer is updated to equal the address of the end of the used space in the previous memory block (OffsetPtr=PREV)
3. Load OffsetPtr+Offset.

For example, FIG. 9 illustrates two memory blocks, blocks G and H which have been used for the current stack frame. The memory block H is the current memory block and the memory block G is the previous memory block. The stack pointer register FSP contains the address of the end of the used space in the memory block H and PREV contains the address of the end of the used space in the memory block G. A variable B stored at an offset of 5 from the end of the used space in the memory block G is to be popped off the stack to the data store $R_0$, such as a register. The memory block H is the current memory block and the stack pointer register FSP contains the address of the end of the used space in the memory block H. An offset pointer is set to equal the current stack pointer FSP (OffsetPtr=FSP), i.e. the address of the end of the used space in the memory block H. The offset is greater than the space used in the current memory block, block H, since the total offset, illustrated in FIG. 9, from the end of the used space in the memory block H to the variable B is 8+4+5=17. Therefore, the offset is updated to be the total offset minus the space used in current memory block (i.e. 17−12=5). The offset pointer is updated to equal the address of the end of the used space in the previous memory block G (OffsetPtr=PREV). Finally, load OffsetPtr+Offset (for example: $ld_R$ $R_0$ (PREV+5)). The register $R_0$ is loaded with the variable currently at the location 5 bytes from the end of the used space in the memory block G indicated by PREV.

The offset is determined by the compiler and is used to access a variable either inside or outside the current stack frame. Block traversal is always necessary for accesses outside the current stack frame, since it is not possible to know where in a block a function call will occur at compile time. Block traversal for accesses within the current stack frame is only necessary when the stack frame is larger than $B_U$.

In one embodiment, when the stack memory region is divided into a plurality of different sized blocks, a further stack pointer may be utilised, for example, the function stack pointer indicates the top of the call stack, and an additional stack pointer indicates the address of the current memory block. In another embodiment, when the stack memory region is divided into a plurality of different sized blocks, a further stack pointer may be utilised to indicate the size of the memory block. The further stack pointer(s) may be normal CPU data stores, such as registers which are used by the compiler for providing stack-pointer-like operations. Alternatively, the size of the memory block can be stored at a predetermined location in the memory block.

The above description refers to the stack memory region being divided into a plurality of blocks, and those blocks being allocated as required by the stack. However, in one embodiment, the memory region of a microcontroller can be divided into a plurality of memory blocks which can be allocated amongst multiple uses, including the stack, such that a separate region of memory is no longer required to be reserved for the stack. Any available memory blocks can be allocated to the stack or for any other use as required. Consequently, the memory region can be shared between uses which results in a smaller overall memory region being required.

In another embodiment, a memory block is allocated for the interrupt allowance Z, and is always available, i.e. one memory block is reserved for the interrupt allowance and cannot be used for any other purposes. The space reserved for the interrupt allowance would start as a single block, but could grow into multiple blocks as function calls are made from the interrupt context (in the same way that the main stack grows). This results in the stack pointer register ISP not needing to be updated during normal execution of functions when not handling an interrupt. The only time after the stack pointer register ISP is initially set that it will change is when executing the code for an interrupt handler. In addition, it is not necessary to allocate storage space to an interrupt allowance Z after each stack frame Y when allocating memory blocks. Therefore, all reference to Z in the above description can be ignored when an area of memory is reserved for the interrupt allowance Z. This embodiment can be accomplished automatically in some architectures by making sure that all interrupts start execution in a different privilege mode from the code executing each stack frame Y. For example, in ARM Cortex-M, interrupts can optionally be set to execute in privileged mode, which uses a different stack pointer.

Although we have referred to two stack pointer registers, the function stack pointer register FSP and the interrupt stack pointer register ISP, in most systems there is typically only one stack pointer. In this case, the ISP is the stack pointer, and the FSP is a normal CPU data store, such as a register, which is used by the compiler for providing stack-pointer-like operations.

The stack-space allocator tracks which memory blocks are currently free and allocates new memory blocks when required. The compiler is capable of generating code which requests a free memory block. The compiler is also capable of generating code which frees a memory block that is no longer required.

When the memory region has been divided into a plurality of memory blocks having at least two different sizes, then the stack-space allocator allocates the required size of memory block.

By allocating memory blocks to the stack as required, the stack is created dynamically whilst a programme is running. Consequently, a large memory region does not need to be reserved for the stack and the overall memory region can be reduced. In addition, since the stack is created dynamically whilst a programme is running it is a lot harder to overflow the stack, which results in increased reliability.

The compiler generates code capable of determining how much free space is available in the current memory block and how much memory space is required by each stack frame. The compiler also generates code capable of determining where to split each stack frame, when more than one memory block has been allocated.

Once the stack frame has completed executing the space in the memory block is no longer required, the memory block becomes available and can be used by a different stack frame, or for some other storage requirement.

As will be appreciated by one skilled in the art, the present techniques may be embodied as a system, method or computer program product. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages.

For example, program code for carrying out operations of the present techniques may comprise source, object or executable code in a conventional programming language (interpreted or compiled) such as C, C++, or assembly code, code for setting up or controlling an ASIC (Application Specific Integrated Circuit) or FPGA (Field Programmable Gate Array), or code for a hardware description language such as RTL, Verilog™ or VHDL (Very high speed integrated circuit Hardware Description Language).

The program code may execute entirely on a user's computer, partly on a user's computer and partly on a remote computer or entirely on a remote computer or server. In the latter scenario, the remote computer may be connected to the user's computer through any type of network. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method.

In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques. As will be appreciated from the foregoing specification, techniques are described wherein said data store comprises a function stack pointer data store.

Techniques are described wherein said data store comprises a function stack pointer data store.

Techniques are described wherein said stack location indicator comprises an address indicating an end of used memory, used by a previous stack frame, in said current memory block.

Techniques are described wherein said stack location indicator comprises an address indicating a beginning of available memory, after a previous stack frame, in said current memory block.

Techniques are described for storing an interrupt location indicator in an interrupt stack pointer data store, said interrupt location indicator indicating a beginning of an amount of memory allocated in said allocated memory block for said interrupt allowance; and updating said interrupt location indicator in said data store.

Techniques are described wherein said interrupt location indicator comprises said stack location indicator when said interrupt allowance and said stack frame are allocated the same memory block.

Techniques are described wherein said interrupt location indicator is different from said stack location indicator when said interrupt allowance and said stack frame are allocated different memory blocks.

Techniques are described wherein said plurality of memory blocks comprises a plurality of same sized memory blocks. Techniques are described wherein said plurality of memory blocks comprises a plurality of different sized memory blocks. The techniques further comprise: storing a memory location indicator indicating said current memory block in a second data store; and using said memory location indicator to identify said current memory block and using said stack location indicator to identify said top of said discontinuous call stack in said current memory block; and updating said memory location indicator in said data store.

Techniques are described wherein previous location indicator comprises an address of a last used byte of said previous memory block.

Techniques are described wherein said previous location indicator comprises an address of a first free word of said previous memory block.

Techniques are described wherein said previous location indicator is stored at a highest location in said current memory block for a downwards growing discontinuous call stack.

Techniques are described wherein said previous location indicator is stored at a lowest location in said current memory block for an upwards growing discontinuous call stack.

Techniques are described for determining that said amount of memory required by said stack frame and said interrupt allowance is less than or equal to said amount of memory available in said current memory block; and allocating said stack frame and said interrupt allowance said current memory block from said plurality of memory blocks in response to said determinations. Memory blocks are utilised more efficiently by storing as many stack frames as possible to each memory block.

Techniques are described for determining that said amount of memory required by said stack frame and said interrupt allowance is greater than said amount of memory available in said current memory block; and allocating said stack frame and said interrupt allowance a new memory block from said plurality of memory blocks in response to said determinations.

Techniques are described for determining that said amount of memory required by said stack frame and said interrupt allowance is greater than said amount of memory available in said current memory block; determining that said amount of memory required by said stack frame is less than or equal to said amount of memory available in said current memory block; and allocating said stack frame said current memory block and allocating said interrupt allowance a new memory block from said plurality of memory blocks in response to said determinations. Memory blocks are utilised more efficiently by storing as many stack frames as possible to each memory block.

Techniques are described for determining that said amount of memory required by said stack frame and said interrupt allowance is greater than said amount of memory available in said current memory block; determining that said amount of memory required by said stack frame is greater than said amount of memory available in said current memory block; and allocating said stack frame and said interrupt allowance at least one new memory block from said plurality of memory blocks in response to said determinations.

Techniques are described for determining that said amount of memory required by said stack frame and said interrupt allowance is greater than said amount of memory available in each new memory block of said plurality of memory blocks; and allocating said stack frame and said interrupt allowance two or more new memory blocks from said plurality of memory blocks in response to said determinations.

Techniques are described for determining that said amount of memory required by said stack frame and said interrupt allowance is greater than said amount of memory available in said current memory block; determining that said amount of memory required by said stack frame is greater than said amount of memory available in said current memory block; determining that said amount of memory required by said stack frame and said interrupt allowance is less than said amount of memory space available in each new memory block from said plurality of memory blocks; and allocating said stack frame and said interrupt allowance a new memory block from said plurality of memory blocks in response to said determinations.

Techniques are described for determining that said amount of memory required by said stack frame and said interrupt allowance is greater than said amount of memory available in each new memory block from said plurality of memory blocks; determining that said amount of memory required by said stack frame is less than said amount of memory available in said new memory block from said plurality of memory blocks; and allocating said stack frame a first new memory block from said plurality of memory blocks and allocating said interrupt allowance a second new memory block from said plurality of memory blocks in response to said determinations.

Techniques are described for determining that said amount of memory required by said stack frame and said interrupt allowance is greater than said amount of memory available in each new memory block from said plurality of memory blocks; determining that said amount of memory required by said stack frame is greater than said amount of memory available in each new memory block from said plurality of memory blocks; and allocating said stack frame and said interrupt allowance two or more new memory blocks from said plurality of memory blocks in response to said determinations.

Techniques are described wherein said current memory block becomes said previous memory block and said new memory block becomes said current memory block.

Techniques are described wherein said amount of memory space available in each new memory block comprises a size of said each new memory block minus an amount of memory required for said previous location indicator.

A large memory region does not need to be reserved for the stack as the stack is created dynamically whilst a programme is running. In addition, since the stack is created dynamically it is a lot harder to overflow the stack, which results in increased reliability.

Techniques are described wherein said stack location indicator comprises an address indicating an end of used memory, used by a previous stack frame, in said current memory block.

Techniques are described wherein said stack location indicator comprises an address indicating a beginning of available memory, after a previous stack frame, in said current memory block. Techniques are described wherein said plurality of memory blocks comprises a plurality of same sized memory blocks.

Techniques are described wherein said plurality of memory blocks comprises a plurality of different sized memory blocks, and said method further comprises: storing a memory location indicator indicating said current memory block in a second data store; and using said memory location indicator to identify said current memory block and using said stack location indicator to identify said top of said discontinuous call stack in said current memory block; and updating said memory location indicator in said data store.

Techniques are described wherein said previous location indicator comprises an address of a last used byte of said previous memory block.

Techniques are described wherein said location of said previous location indicator comprises an address of a first free word of said previous memory block.

Techniques are described wherein said location of said previous location indicator is stored at a highest location in said current memory block for a downwards growing discontinuous call stack.

Techniques are described wherein said location of said previous location indicator is stored at a lowest location in said current memory block for an upwards growing discontinuous call stack.

Techniques are described for determining that said amount of memory required by said stack frame is less than or equal to said amount of memory available in said current memory block; and allocating said stack frame said current memory block from said plurality of memory blocks in response to said determinations.

Techniques are described for determining that said amount of memory required by said stack frame is greater than said amount of memory available in said current memory block; and allocating said stack frame a new memory block from said plurality of memory blocks in response to said determinations.

Techniques are described for determining that said amount of memory required by said stack frame is greater than said amount of memory available in said current memory block; determining that said amount of memory space required by said stack frame is greater than said amount of memory space available in each of said plurality of memory blocks; and allocating said stack frame two or more new memory blocks from said plurality of memory blocks in response to said determinations.

Accordingly, some aspects and features of the disclosed embodiments are set out in the following numbered items:
1. A method for managing a discontinuous call stack comprising at least one memory block from a plurality of memory blocks, the method comprising: storing a stack location indicator indicating a top of said discontinuous call stack in a data store; using said stack location indicator to identify a current memory block of said discontinuous call stack from said plurality of memory blocks, said current memory block storing said top of said discontinuous call stack and a previous location indicator indicating a location of a previous memory block of said discontinuous call stack; determining an amount of memory available in said current memory block; determining an amount of memory required for a stack frame; determining an amount of memory required for an interrupt allowance; allocating said stack frame and said interrupt allowance at least one memory block from said plurality of memory blocks in response to said determinations; storing said stack frame in said allocated memory block; and updating said stack location indicator in said data store, such that said updated stack location indicator can be used to identify said allocated memory block which has become said current memory block.

2. The method of item 1, wherein said data store comprises a function stack pointer data store.

3. The method of item 1 or item 2, wherein said stack location indicator comprises an address indicating an end of used memory, used by a previous stack frame, in said current memory block.

4. The method of item 1 or item 2, wherein said stack location indicator comprises an address indicating a beginning of available memory, after a previous stack frame, in said current memory block.

5. The method of any one of items 1 to 4, further comprising: storing an interrupt location indicator in an interrupt stack pointer data store, said interrupt location indicator indicating a beginning of an amount of memory allocated in said allocated memory block for said interrupt allowance; and updating said interrupt location indicator in said data store.

6. The method of item 5, wherein said interrupt location indicator comprises said stack location indicator when said interrupt allowance and said stack frame are allocated the same memory block.

7. The method of item 5, wherein said interrupt location indicator is different from said stack location indicator when said interrupt allowance and said stack frame are allocated different memory blocks.

8. The method of any one of items 1 to 7, wherein said plurality of memory blocks comprises a plurality of same sized memory blocks.

9. The method of any one of items 1 to 7, wherein said plurality of memory blocks comprises a plurality of different sized memory blocks, and said method further comprises: storing a memory location indicator indicating said current memory block in a second data store; and using said memory location indicator to identify said current memory block and using said stack location indicator to identify said top of said discontinuous call stack in said current memory block; and updating said memory location indicator in said data store.

10. The method of any one of items 1 to 9, wherein said previous location indicator comprises an address of a last used byte of said previous memory block 11. The method of any one of items 1 to 9, wherein said previous location indicator comprises an address of a first free word of said previous memory block.

12. The method of any one of items 1 to 11, wherein said previous location indicator is stored at a highest location in said current memory block for a downwards growing discontinuous call stack.

13. The method of any one of items 1 to 11, wherein said previous location indicator is stored at a lowest location in said current memory block for an upwards growing discontinuous call stack.

14. The method of any one of items 1 to 13, further comprising: determining that said amount of memory required by said stack frame and said interrupt allowance is less than or equal to said amount of memory available in said current memory block; and allocating said stack frame and said interrupt allowance said current memory block from said plurality of memory blocks in response to said determinations.

15. The method of any one of items 1 to 13, further comprising: determining that said amount of memory required by said stack frame and said interrupt allowance is greater than said amount of memory available in said current memory block; and allocating said stack frame and said interrupt allowance a new memory block from said plurality of memory blocks in response to said determinations.

16. The method of any one of items 1 to 13, further comprising: determining that said amount of memory required by said stack frame and said interrupt allowance is greater than said amount of memory available in said current memory block; determining that said amount of memory required by said stack frame is less than or equal to said amount of memory available in said current memory block; and allocating said stack frame said current memory block and allocating said interrupt allowance a new memory block from said plurality of memory blocks in response to said determinations.

17. The method of any one of items 1 to 13, further comprising: determining that said amount of memory required by said stack frame and said interrupt allowance is greater than said amount of memory available in said current memory block; determining that said amount of memory required by said stack frame is greater than said amount of memory available in said current memory block; and allocating said stack frame and said interrupt allowance at least one new memory block from said plurality of memory blocks in response to said determinations.

18. The method of any one of items 1 to 13, further comprising: determining that said amount of memory required by said stack frame and said interrupt allowance is greater than said amount of memory available in each new memory block of said plurality of memory blocks; and allocating said stack frame and said interrupt allowance two or more new memory blocks from said plurality of memory blocks in response to said determinations.

19. The method of any one of items 1 to 13, further comprising: determining that said amount of memory required by said stack frame and said interrupt allowance is greater than said amount of memory available in said current memory block; determining that said amount of memory required by said stack frame is greater than said amount of memory available in said current memory block; determining that said amount of memory required by said stack frame and said interrupt allowance is less than said amount of memory space available in each new memory block from said plurality of memory blocks; and allocating said stack frame and said interrupt allowance a new memory block from said plurality of memory blocks in response to said determinations.

20. The method of any one of items 1 to 13, further comprising: determining that said amount of memory required by said stack frame and said interrupt allowance is greater than said amount of memory available in each new memory block from said plurality of memory blocks; determining that said amount of memory required by said stack frame is less than said amount of memory available in said new memory block from said plurality of memory blocks; and allocating said stack frame a first new memory block from said plurality of memory blocks and allocating said interrupt allowance a second new memory block from said plurality of memory blocks in response to said determinations.

21. The method of any one of items 1 to 13, further comprising: determining that said amount of memory required by said stack frame and said interrupt allowance is greater than said amount of memory available in each new memory block from said plurality of memory blocks; determining that said amount of memory required by said stack frame is greater than said amount of memory available in each new memory block from said plurality of memory blocks; and allocating said stack frame and said interrupt allowance two or more new memory blocks from said plurality of memory blocks in response to said determinations.

22. The method of any one of items 15 to 19, wherein said current memory block becomes said previous memory block and said new memory block becomes said current memory block.

23. The method any one of items 18 to 21, wherein said amount of memory space available in each new memory block comprises a size of said each new memory block minus an amount of memory required for said previous location indicator.

24. A method for managing a discontinuous call stack comprising at least one memory block from a plurality of memory blocks, the method comprising: reserving at least one of said plurality of memory blocks for interrupts; storing an interrupt location indicator indicating said reserved memory block in an interrupt stack pointer data store; storing a stack location indicator indicating a top of said discontinuous call stack in a function stack pointer data store; using said stack location indicator to identify a current memory block of said discontinuous call stack from said plurality of memory blocks, said current memory block storing said top of said discontinuous call stack and a previous location indicator indicating a location of a previous memory block of said discontinuous call stack; determining an amount of memory available in said current memory block; determining an amount of memory required for a stack frame; allocating said stack frame at least one memory block from said plurality of memory blocks in response to said determinations; storing said stack frame in said allocated memory block; and updating said stack location indicator in said function stack pointer data store, such that said updated stack location indicator can be used to identify said allocated memory block which has become said current memory block.

25. The method of item 24, wherein said stack location indicator comprises an address indicating an end of used memory, used by a previous stack frame, in said current memory block.

26. The method of item 24, wherein said stack location indicator comprises an address indicating a beginning of available memory, after a previous stack frame, in said current memory block.

27. The method of any one of items 24 to 26, wherein said plurality of memory blocks comprises a plurality of same sized memory blocks.

28. The method of any one of items 24 to 26, wherein said plurality of memory blocks comprises a plurality of different sized memory blocks, and said method further comprising: storing a memory location indicator indicating said current memory block in a second data store; and using said memory location indicator to identify said current memory block and using said stack location indicator to identify said top of said discontinuous call stack in said current memory block; and updating said memory location indicator in said data store.

29. The method of any one of items 24 to 28, wherein said previous location indicator comprises an address of a last used byte of said previous memory block 30. The method of any one of items 24 to 28, wherein said previous location indicator comprises an address of a first free word of said previous memory block.

31. The method of any one of items 24 to 30, wherein said previous location indicator is stored at a highest location in said current memory block for a downwards growing discontinuous call stack.

32. The method of any one of items 24 to 30, wherein said previous location indicator is stored at a lowest location in said current memory block for an upwards growing discontinuous call stack.

33. The method of any one of items 24 to 32, further comprising: determining that said amount of memory required by said stack frame is less than or equal to said amount of memory available in said current memory block; and allocating said stack frame said current memory block from said plurality of memory blocks in response to said determinations.

34. The method of any one of items 24 to 32, further comprising: determining that said amount of memory required by said stack frame is greater than said amount of memory available in said current memory block; and allocating said stack frame a new memory block from said plurality of memory blocks in response to said determinations.

35. The method of any one of items 24 to 32, further comprising: determining that said amount of memory required by said stack frame is greater than said amount of memory available in said current memory block; determining that said amount of memory space required by said stack frame is greater than said amount of memory space available in each of said plurality of memory blocks; and allocating said stack frame two or more new memory blocks from said plurality of memory blocks in response to said determinations.

36. A computer program product comprising program code for performing the methods of any one of items 1 to 35.

37. A method for managing a discontinuous call stack comprising at least one memory block from a plurality of memory blocks, the method comprising: storing a stack location indicator indicating a top of said discontinuous call stack in a register; using said stack location indicator to identify a current memory block of said discontinuous call stack from said plurality of memory blocks, said current memory block storing said top of said discontinuous call stack and a previous location indicator indicating a location of a previous memory block of said discontinuous call stack; determining an amount of memory available in said current memory block; determining an amount of memory required for a stack frame; determining an amount of memory required for an interrupt allowance; allocating said stack frame and said interrupt allowance at least one memory block from said plurality of memory blocks in response to said determinations; storing said stack frame in said allocated memory block; and updating said stack location indicator in said register, such that said updated stack location indicator can be used to identify said allocated memory block which has become said current memory block.

The invention claimed is:

1. A method for managing a discontinuous call stack comprising at least one memory block from a plurality of memory blocks, the method comprising:
   storing a stack location indicator indicating a top of said discontinuous call stack in a data store;
   using said stack location indicator to identify a current memory block of said discontinuous call stack from said plurality of memory blocks, said current memory block storing said top of said discontinuous call stack and a previous location indicator indicating a location of a previous memory block of said discontinuous call stack;
   determining an amount of memory available in said current memory block;

determining an amount of memory required for a stack frame;

determining an amount of memory required for an interrupt allowance;

allocating said stack frame and said interrupt allowance at least one memory block from said plurality of memory blocks in response to said determinations;

storing said stack frame in said allocated memory block; and updating said stack location indicator in said data store, such that said updated stack location indicator can be used to identify said allocated memory block which has become said current memory block.

2. The method of claim 1, wherein said data store comprises a function stack pointer data store.

3. The method of claim 1, wherein said stack location indicator comprises an address indicating an end of used memory, used by a previous stack frame, in said current memory block.

4. The method of claim 1, wherein said stack location indicator comprises an address indicating a beginning of available memory, after a previous stack frame, in said current memory block.

5. The method of claim 1, further comprising:

storing an interrupt location indicator in an interrupt stack pointer data store, said interrupt location indicator indicating a beginning of an amount of memory allocated in said allocated memory block for said interrupt allowance; and updating said interrupt location indicator in said data store.

6. The method of claim 5, wherein said interrupt location indicator comprises said stack location indicator when said interrupt allowance and said stack frame are allocated the same memory block.

7. The method of claim 5, wherein said interrupt location indicator is different from said stack location indicator when said interrupt allowance and said stack frame are allocated different memory blocks.

8. The method of claim 1, wherein said plurality of memory blocks comprises a plurality of different sized memory blocks, and said method further comprises:

storing a memory location indicator indicating said current memory block in a second data store; and using said memory location indicator to identify said current memory block and using said stack location indicator to identify said top of said discontinuous call stack in said current memory block; and updating said memory location indicator in said data store.

9. The method of claim 1, further comprising:

determining that said amount of memory required by said stack frame and said interrupt allowance is greater than said amount of memory available in said current memory block;

determining that said amount of memory required by said stack frame is less than or equal to said amount of memory available in said current memory block; and allocating said stack frame said current memory block and allocating said interrupt allowance a new memory block from said plurality of memory blocks in response to said determinations.

10. The method of claim 1, further comprising:

determining that said amount of memory required by said stack frame and said interrupt allowance is greater than said amount of memory available in said current memory block;

determining that said amount of memory required by said stack frame is greater than said amount of memory available in said current memory block; and allocating said stack frame and said interrupt allowance at least one new memory block from said plurality of memory blocks in response to said determinations.

11. The method of claim 1, further comprising:

determining that said amount of memory required by said stack frame and said interrupt allowance is greater than said amount of memory available in each new memory block of said plurality of memory blocks; and allocating said stack frame and said interrupt allowance two or more new memory blocks from said plurality of memory blocks in response to said determinations.

12. The method of claim 1, further comprising:

determining that said amount of memory required by said stack frame and said interrupt allowance is greater than said amount of memory available in said current memory block;

determining that said amount of memory required by said stack frame is greater than said amount of memory available in said current memory block;

determining that said amount of memory required by said stack frame and said interrupt allowance is less than said amount of memory space available in each new memory block from said plurality of memory blocks; and allocating said stack frame and said interrupt allowance a new memory block from said plurality of memory blocks in response to said determinations.

13. The method of claim 1, further comprising:

determining that said amount of memory required by said stack frame and said interrupt allowance is greater than said amount of memory available in each new memory block from said plurality of memory blocks;

determining that said amount of memory required by said stack frame is less than said amount of memory available in said new memory block from said plurality of memory blocks; and allocating said stack frame a first new memory block from said plurality of memory blocks and allocating said interrupt allowance a second new memory block from said plurality of memory blocks in response to said determinations.

14. The method of claim 1, further comprising:

determining that said amount of memory required by said stack frame and said interrupt allowance is greater than said amount of memory available in each new memory block from said plurality of memory blocks;

determining that said amount of memory required by said stack frame is greater than said amount of memory available in each new memory block from said plurality of memory blocks; and allocating said stack frame and said interrupt allowance two or more new memory blocks from said plurality of memory blocks in response to said determinations.

15. A computer program product, stored on a non-transitory computer-readable storage medium, comprising program code for performing the methods of claim 1.

16. A method for managing a discontinuous call stack comprising at least one memory block from a plurality of memory blocks, the method comprising:

reserving at least one of said plurality of memory blocks for interrupts;

storing an interrupt location indicator indicating said reserved memory block in an interrupt stack pointer data store;

storing a stack location indicator indicating a top of said discontinuous call stack in a function stack pointer data store;

using said stack location indicator to identify a current memory block of said discontinuous call stack from said plurality of memory blocks, said current memory block storing said top of said discontinuous call stack and a previous location indicator indicating a location of a previous memory block of said discontinuous call stack;

determining an amount of memory available in said current memory block;

determining an amount of memory required for a stack frame;

allocating said stack frame at least one memory block from said plurality of memory blocks in response to said determinations;

storing said stack frame in said allocated memory block; and updating said stack location indicator in said function stack pointer data store, such that said updated stack location indicator can be used to identify said allocated memory block which has become said current memory block.

17. The method of claim 16, wherein said plurality of memory blocks comprises a plurality of different sized memory blocks, and said method further comprising:

storing a memory location indicator indicating said current memory block in a second data store; and using said memory location indicator to identify said current memory block and using said stack location indicator to identify said top of said discontinuous call stack in said current memory block; and updating said memory location indicator in said data store.

18. The method of claim 16, further comprising:

determining that said amount of memory required by said stack frame is less than or equal to said amount of memory available in said current memory block; and allocating said stack frame said current memory block from said plurality of memory blocks in response to said determinations.

19. The method of claim 16, further comprising:

determining that said amount of memory required by said stack frame is greater than said amount of memory available in said current memory block; and allocating said stack frame a new memory block from said plurality of memory blocks in response to said determinations.

20. The method of claim 16, further comprising:

determining that said amount of memory required by said stack frame is greater than said amount of memory available in said current memory block;

determining that said amount of memory space required by said stack frame is greater than said amount of memory space available in each of said plurality of memory blocks; and allocating said stack frame two or more new memory blocks from said plurality of memory blocks in response to said determinations.

* * * * *